(12) United States Patent
Miyasaka

(10) Patent No.: US 9,897,438 B2
(45) Date of Patent: Feb. 20, 2018

(54) DIFFRACTION OPTICAL ELEMENT, PROJECTION DEVICE, AND MEASUREMENT DEVICE

(71) Applicant: Asahi Glass Company, Limited, Chiyoda-ku (JP)

(72) Inventor: Koji Miyasaka, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 67 days.

(21) Appl. No.: 15/057,654

(22) Filed: Mar. 1, 2016

(65) Prior Publication Data

US 2016/0178358 A1     Jun. 23, 2016

Related U.S. Application Data

(63) Continuation of application No. PCT/JP2014/072616, filed on Aug. 28, 2014.

(30) Foreign Application Priority Data

Sep. 2, 2013  (JP) .................................. 2013-181310

(51) Int. Cl.
  *G01B 11/25*  (2006.01)
  *G02B 27/30*  (2006.01)
  (Continued)

(52) U.S. Cl.
  CPC ............ *G01B 11/254* (2013.01); *G01B 11/25* (2013.01); *G02B 27/1086* (2013.01);
  (Continued)

(58) Field of Classification Search
  None
  See application file for complete search history.

(56) References Cited

U.S. PATENT DOCUMENTS 3,567,561 A  *  3/1971  Wood ........................ B44F 1/04
                                                     359/567
3,664,745 A  *  5/1972  Smith ..................... G01B 11/06
                                                     356/492
(Continued)

FOREIGN PATENT DOCUMENTS

JP         1-318905      12/1989
JP         5-40021       2/1993
(Continued)

OTHER PUBLICATIONS

International Search Report dated Sep. 30, 2014 in PCT/JP2014/072616, filed on Aug. 28, 2014 (with English Translation).
(Continued)

*Primary Examiner* — Shawn Decenzo
*Assistant Examiner* — Jarreas C Underwood
(74) *Attorney, Agent, or Firm* — Oblon, McClelland, Maier & Neustadt, L.L.P.

(57) ABSTRACT

To make it possible to emit a light pattern with a uniform light quantity within a detection surface in spite of 0th-order diffracted light included therein or to emit a light pattern for overall irradiation with a uniform light quantity distribution, without limiting a degree of freedom for design of the emitted light pattern.
In a diffraction optical element according to the invention, a divergence angle converting function that is a function of converting the divergence angle of incident light due to diffraction effect and a light beam splitting function that is a function of splitting an incident light beam into a plurality of light beams due to diffraction effect are combined so that incident light as divergent light is split into a plurality of diffracted lights with different divergence angles from the divergence angle of the incident light and the diffracted lights is emitted.

19 Claims, 18 Drawing Sheets

(51) Int. Cl.
  *G02B 5/18* (2006.01)
  *G02B 27/10* (2006.01)
  *G02B 27/42* (2006.01)
(52) U.S. Cl.
  CPC ......... *G02B 27/30* (2013.01); *G02B 27/4233* (2013.01); *G02B 5/18* (2013.01)

(56) References Cited

U.S. PATENT DOCUMENTS

| | | | | |
|---|---|---|---|---|
| 4,148,556 A | * | 4/1979 | Sauter | G02B 6/29322 |
| | | | | 385/16 |
| 4,257,673 A | * | 3/1981 | Matthijsse | G02B 6/2848 |
| | | | | 359/569 |
| 4,341,471 A | * | 7/1982 | Hogg | G01N 15/1436 |
| | | | | 250/574 |
| 4,626,069 A | * | 12/1986 | Dammann | G02B 6/2848 |
| | | | | 359/569 |
| 4,701,005 A | * | 10/1987 | Noguchi | G02B 5/32 |
| | | | | 359/17 |
| 5,587,815 A | * | 12/1996 | Sato | G02B 5/1876 |
| | | | | 359/11 |
| 6,075,627 A | | 6/2000 | Feldman et al. | |
| 6,278,548 B1 | * | 8/2001 | Shimano | B82Y 10/00 |
| | | | | 359/565 |
| 6,493,143 B2 | * | 12/2002 | Kato | G02B 5/1866 |
| | | | | 359/354 |
| 7,319,559 B2 | * | 1/2008 | Nakama | G02B 5/1823 |
| | | | | 359/569 |
| 7,572,015 B2 | * | 8/2009 | Kobayashi | G02B 27/48 |
| | | | | 348/195 |
| 8,358,456 B2 | * | 1/2013 | Urakawa | H04N 9/3129 |
| | | | | 359/202.1 |
| 8,599,484 B2 | * | 12/2013 | Miyasaka | G02B 5/1861 |
| | | | | 356/603 |
| 9,052,512 B2 | * | 6/2015 | Miyasaka | G02B 27/4266 |
| 2003/0113065 A1 | * | 6/2003 | Ohmura | G02B 6/02138 |
| | | | | 385/37 |
| 2012/0038934 A1 | | 2/2012 | Miyasaka et al. | |
| 2012/0223218 A1 | | 9/2012 | Miyasaka | |
| 2013/0136305 A1 | | 5/2013 | Shpunt et al. | |
| 2013/0153756 A1 | | 6/2013 | Umeda et al. | |

FOREIGN PATENT DOCUMENTS

| | | |
|---|---|---|
| JP | 2000-347015 | 12/2000 |
| JP | 2002-14214 | 1/2002 |
| JP | 2002-228818 | 8/2002 |
| JP | 2003-337216 | 11/2003 |
| JP | 3694048 | 9/2005 |
| JP | 2006-317806 | 11/2006 |
| JP | 2008-46659 | 2/2008 |
| JP | 2009-531655 | 9/2009 |
| JP | 2012-32379 | 2/2012 |
| JP | 2012-58729 | 3/2012 |
| JP | 2012-194543 | 10/2012 |
| WO | WO 2009/093228 A2 | 7/2009 |

OTHER PUBLICATIONS

Written Opinion dated Sep. 30, 2014 in PCT/JP2014/072616, filed on Aug. 28, 2014 (English translation only. Original document was submitted on Mar. 1, 2016.).

* cited by examiner

DIFFRACTION OPTICAL ELEMENT, PROJECTION DEVICE, AND MEASUREMENT DEVICE

TECHNICAL FIELD

The present invention relates to a diffraction optical element, a projection device and a measurement device.

BACKGROUND ART

There is a device for performing three-dimensional measurement in such a manner that a measuring object is irradiated with predetermined light and light scattered by the measuring object is detected. As such a three-dimensional measurement device, there has been known a measurement device (Patent Document 1) in which a measuring object is irradiated with a specific light pattern so that the shape or the like of the measuring object can be measured, or a measurement device using a time-of-flight method. In the former method, a change in the specific light pattern is measured to measure a distance between the measurement device and the measuring object at a plurality of places. On the other hand, in the time-of-flight method, illumination light is emitted to an object, and the light reflected from the object is then received by a light reception portion. Thus, time of flight of the light therebetween is measured to obtain distance information.

When a measuring object is irradiated with a specific light pattern or illumination light in these methods, a predetermined light pattern may be generated using a diffraction optical element so that the measuring object can be irradiated with the generated light pattern. In this configuration, the generated light pattern is defined as a group of light spots each having a light quantity not lower than a predetermined light quantity and generated by a plurality of diffracted lights. When the positions and light intensities of the light spots are controlled, the specific light pattern can be formed. In addition, when the light spots overlap one another, the light spots can form illumination light.

In order to perform detection with high detection sensitivity, it is preferably that the generated light pattern has a uniform light quantity within a detection surface.

However, when parallel light is incident on a diffraction optical element, 0th-order diffracted light may be emitted as light with a large light quantity. In such a case, there arises a problem that light spots of the other diffracted lights weaker than the 0th-order diffracted light cannot be recognized. Even when the gain is adjusted to be higher, there arises a problem that blur or the like occurs around a light spot of the 0th-order diffracted light so that the light spots of the other diffracted lights around the light spot of the 0th-order diffracted light cannot be recognized. As a configuration for suppressing occurrence of such 0th-diffracted light, there has been known a configuration in which a plurality of diffraction optical elements are stacked, for example, as disclosed in Patent Document 2.

In addition, as techniques related to the present invention, Patent Document 3 and Patent Document 4 suggest examples of optical elements in which a diffusion function and a diffractive lens function are integrated.

PRIOR ART REFERENCE

Patent Document

Patent Document 1: JP-T-2009-531655
Patent Document 2: WO2009/093228
Patent Document 3: Japanese Patent No. 3694048
Patent Document 4: U.S. Pat. No. 6,075,627

SUMMARY OF THE INVENTION

Problems to be Solved by the Invention

However, in the configuration in which a plurality of diffraction optical elements are stacked, there is a problem as to alignment at the time of the stack. In addition, due to limitation in a pattern of light that can be emitted, there is a problem that a desired light pattern cannot be established.

When divergent light is incident on a diffraction optical element, 0th-order diffracted light can be emitted as divergent light to reduce the optical density of the 0th-order diffracted light. In this case, however, the other diffracted lights are also emitted as divergent lights. Therefore, there is a problem that a desired light pattern cannot be generated, for example, because the diffracted lights overlap one another on a projection surface.

Incidentally, optical elements described in Patent Document 3 and Patent Document 4 are optical elements for uniform illumination. The optical elements having a diffusion function are simply combined with a lens function such as deflection or condensing in order to diffuse an image while expanding or narrowing the diffusing range or shifting the diffusing range. There is no consideration about emission of a predetermined light pattern in which light spots can be recognized independently or about reduction in the optical density of 0th-order diffracted light at that time. Therefore, the aforementioned problems cannot be solved in the configuration described in Patent Document 3 or Patent Document 4.

Further, in the case where a diffractive lens function is added to a diffraction optical element for emitting a predetermined light pattern, dimensions of concavities and convexities forming the diffraction optical element have to be reduced when divergent light is incident thereon with a large divergence angle or when light outgoes therefrom with a large outgoing angle. Thus, there arises a problem that it is difficult to process the diffraction optical element. Even in such a case, it is preferable that it is possible to emit a predetermined light pattern while avoiding difficulty in processing. Incidentally, Patent Document 3 suggests a method in which the level difference and the width of concavities and convexities are doubled to use higher-order diffracted light in order to avoid difficulty in processing caused by reduction in width of an concavity and convexity pattern of a diffractive lens. When a specific light pattern is emitted, it is preferable that it is possible to avoid difficulty in processing without changing the order in order to avoid redesigning.

In addition, generally, when the outgoing angle of emitted light increases, the light quantity of a wide-angle component of the outgoing light may be reduced. The same thing can be applied to a light beam including a plurality of diffracted lights. In such a case, there is a case where a satisfactory degree of freedom for design cannot be obtained when designing is performed using only the intensities of the diffracted lights as parameters.

It is therefore an object of the present invention to provide a diffraction optical element, a projection device and a measurement device capable of emitting a light pattern with a uniform light quantity within a detection surface without limiting a degree of freedom for design of the emitted light pattern.

Further, it is another object of the invention to provide a diffraction optical element, a projection device and a measurement device capable of being easily processed even when divergent light incident thereon has a large divergence angle or when light outgoing therefrom has a large outgoing angle.

In addition, it is further another object of the invention to provide a diffraction optical element, a projection device and a measurement device capable of performing overall irradiation with a uniform light quantity distribution.

It can be also considered that an uneven light quantity distribution is desired. It is therefore further another object of the invention to provide a diffraction optical element, a projection device and a measurement device capable of emitting a light pattern with a desired light quantity distribution on a predetermined projection surface.

Solution to the Problems

According to one aspect of the invention, there is provided a diffraction optical element, wherein: a divergence angle converting function of converting a divergence angle of incident light based on diffraction effect and a light beam splitting function of splitting an incident light beam into a plurality of light beams based on diffraction effect are combined so that the incident light as a divergent light is split into a plurality of diffracted lights having divergence angles different from the divergence angle of the incident light and the diffracted lights is emitted.

With the configuration in which the divergence angle converting function and the light beam splitting function are combined, not only it is possible to emit each split diffracted light converted into a light beam with a desired divergence angle, but it is also possible to emit 0th-order diffracted light as divergent light. It is therefore possible to reduce the light quantity of the 0th-order diffracted light on a projection surface without limiting the degree of freedom for design of an emitted light pattern. As a result, it is possible to emit a light pattern with a uniform light quantity within a detection surface, or even if the 0th-order diffracted light is included, it is possible to perform overall irradiation with a uniform light quantity distribution. In addition, if the density distribution or the light intensity of each diffracted light is adjusted in the light beam splitting function, it is possible to emit a light pattern with a desired light quantity distribution on a predetermined projection surface.

Further, according to another aspect of the invention, the diffraction optical element may include a diffraction portion configured to form an concavity and convexity pattern for giving a phase distribution to the incident light; wherein in the concavity and convexity pattern, an in-plane distribution of a third phase obtained by superimposition of a first phase and a second phase is converted into an concavity and convexity shape, the first phase expressing a diffraction function of converting the divergence angle of the incident light, the second phase expressing a diffraction function of splitting the incident light beam into a plurality of light beams.

With this configuration, the aforementioned effect can be obtained only if the concavity and convexity pattern is processed in one surface.

Further, the first phase may be expressed by two or more gradations, and the number of gradations with which the first phase is expressed is smaller at a certain distance or more from a center of the phase than at the center, and at the certain distance or more from the center of the phase, height of each stage in the concavity and convexity pattern may be greater than height of each stage around the center.

With this configuration, even if the divergence angle of the incident light is large, it is possible to adjust the concavity and convexity shape to be wide enough to be processed. Thus, it is possible to prevent a problem that the concavity and convexity shape cannot be processed or occurrence of unnecessary stray light caused by a poor processed shape or the like.

Further, the first phase may diffract divergent light to convert into parallel light, the divergent light being irradiated from a light emitting point located at a predetermined distance.

With this configuration, it is possible to project a specific light pattern onto a projection surface while reducing the light density of the 0th-order diffracted light.

Further, according to still another aspect of the invention, when a projection surface perpendicular to an optical axis of emitted 0th-order light is divided into a plurality of regions, an average value of a light quantity in each region on the projection surface may increase or decrease in a certain direction. Further, according to still another aspect of the invention, when the projection surface perpendicular to the optical axis of the emitted 0th-order light is divided into a plurality of regions, density of diffracted light in each region on the projection surface or average light intensity of diffracted light in each region on the projection surface may increase or decrease in a certain direction.

With this configuration, even when the device is placed in an inclined manner, the light quantity distribution of a light pattern on a main projection surface can be made uniform.

Further, according to still another aspect of the invention, there is provided a projection device including: a light source configured to emit divergent light; and a diffraction optical element according to any one of the above diffraction optical elements, wherein a predetermined light pattern is formed on a predetermined projection surface by the diffracted lights diffracted by the diffraction optical element.

Further, according to still another aspect of the invention, there is provided a measurement device including: a projection device, according to the above, configured to irradiate a measuring object with a predetermined light pattern; and a detection portion configured to detect scattered light generated by irradiation of the measuring object with light emitted from the projection device, wherein the projection device is a projection device according to the above.

Advantageous Effects of the Invention

According to the invention, it is possible to provide a diffraction optical element, a projection device and a measurement device capable of emitting a light pattern with a uniform light quantity within a detection surface in spite of 0th-order diffracted light included therein or emitting a light pattern to perform allover irradiation with a uniform light quantity distribution, without limiting a degree of freedom for design of the emitted light pattern. In addition, according to the invention, it is possible to provide a diffraction optical element, a projection device and a measurement device capable of emitting a light pattern with a desired light quantity distribution on a predetermined projection surface. Further, according to the invention, in addition to the aforementioned advantages, it is possible to provide a diffraction optical element, a projection device and a measurement device capable of being easily processed even when divergent light incident thereon has a large divergence angle or when light outgoing therefrom has a large outgoing angle.

MODES FOR CARRYING OUT THE INVENTION

An embodiment of the invention will be described below with reference to the drawings. Incidentally, the same members and so on are referenced correspondingly, and description thereof will be omitted.

Embodiment 1

Figure 1:
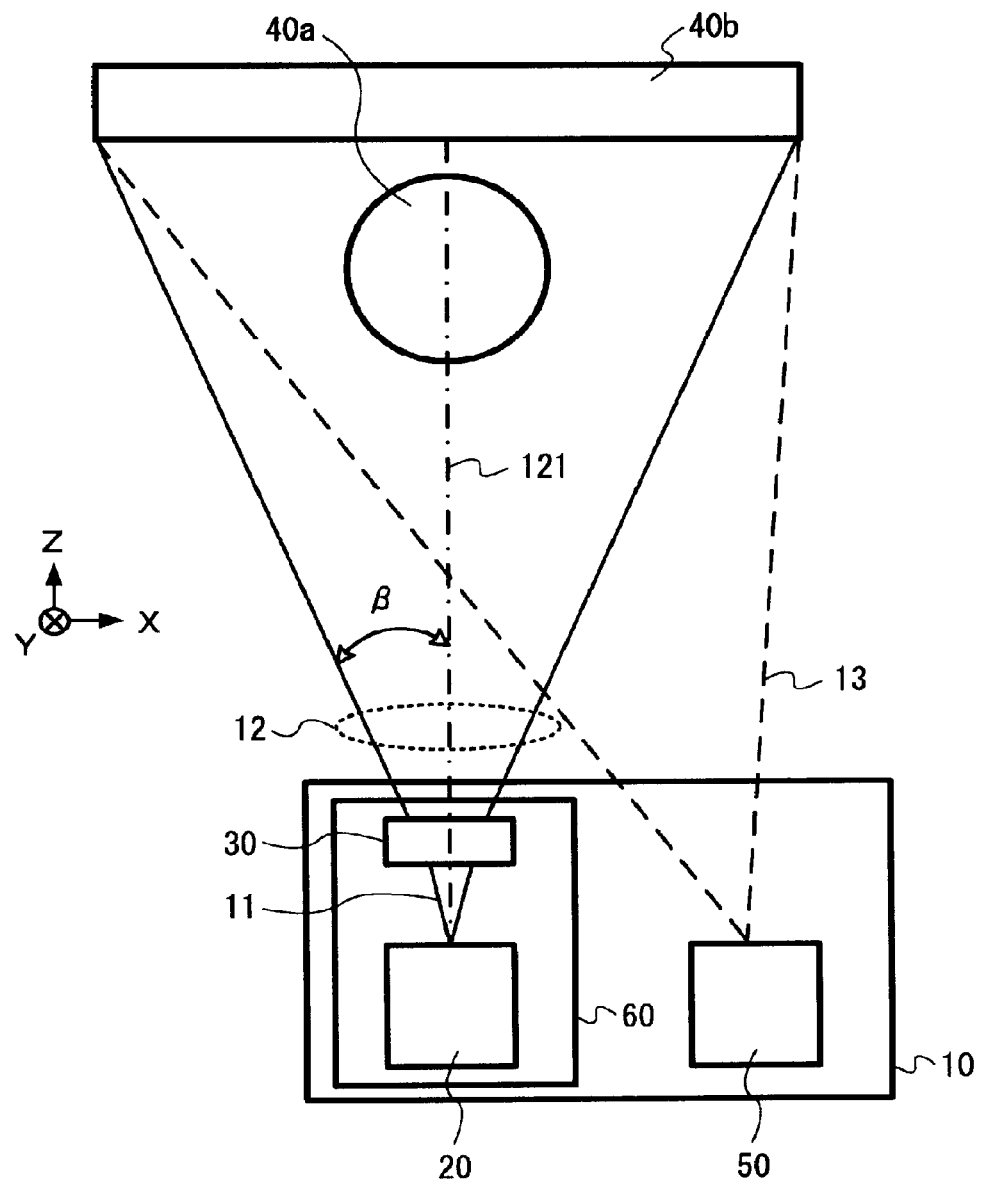
FIG. 1 is a configuration diagram showing an example of a configuration of a measurement device according to a first embodiment.

FIG. 1 is a configuration diagram showing an example of a configuration of a measurement device according to a first embodiment of the invention. A measurement device 10 according to the embodiment has a projection device 60 including a light source 20 and a diffraction optical element 30, and a detection element 50 as shown in FIG. 1. The projection device 60 emits diffracted lights 12 for forming a predetermined light pattern on a predetermined projection surface. On the other hand, the detection element 50 detects scattered light from measuring objects 40a and 40b irradiated with the diffracted lights 12.

Incident light 11 emitted from the light source 20 is incident on the diffraction optical element 30, in which the diffracted lights 12 are generated. The diffraction optical element 30 has a portion with a diffraction effect. The incident light 11 as divergent light enters the portion. The divergence angle of the incident light 11 is changed by the diffraction effect of the diffraction optical element 30, and rays thereof are split by the diffraction effect of the diffraction optical element 30. Thus, the incident light 11 is emitted as a plurality of diffracted lights 12. The diffracted lights 12 emitted from the diffraction optical element 30 are, for example, formed into light spots respectively, so as to form a predetermined light pattern on a predetermined projection surface. Incidentally, in the diffracted lights 12 emitted from the diffraction optical element 30, 0th-order diffracted light may be included in addition to ±1st or higher order diffracted lights emitted to form the predetermined light pattern. However, as will be described later, the 0th-order diffracted light emitted from the diffraction optical element 30 can be made much smaller in light quantity on the projection surface than the ±1st or higher order diffracted lights. It is therefore assumed that the influence of the 0th-order diffracted light on a light quantity distribution on the projection surface can be neglected. Incidentally, the influence of the 0th-order diffracted light on the light quantity distribution on the projection surface is not neglected but the 0th-order diffracted light may be added to design a desired light pattern.

After the measuring objects 40a and 40b are irradiated with the predetermined light pattern based on the diffracted lights 12, reflected light 13 reflected by the measuring objects 40a and 40b is detected by the detection element 50. Based on information detected thus by the detection element 50, information about the measuring objects 40a and 40b such as their three-dimensional shapes can be acquired. The detection element 50 may be, for example, an image pickup element. In that case, the image pickup element takes an image using the reflected light 13 so that information about the measuring objects 40a and 40b such as their three-dimensional shapes can be acquired.

For example, predetermined modulation is applied to light emitted from the light source 20 in advance, and a temporal lag between the phase of the applied predetermined modulation and the phase of the reflected light 13 as scattered light reflected by the measuring objects 40a and 40b and detected by the detection element 50 is then measured. Thus, information about the measuring objects 40a and 40b such as their distances or three-dimensional shapes can be acquired. For example, the intensity of light emitted from the light source 20 may be modulated with a sine wave, a rectangular wave or the like.

Incidentally, in order to perform three-dimensional measurement, it is preferable that the number of light spots is at least 100. When a group of beams made of the diffracted lights 12 emitted from the diffraction optical element 30 is regarded as a single light beam, assume that an angle measured from an optical axis 121 of the light beam is an outgoing angle β. In this case, in either an X-axis direction or a Y-axis direction, the outgoing angle β is preferably not smaller than 7.5°, more preferably not smaller than 15°, and further more preferably not smaller than 30°. In this manner, measurement can be performed in a wide range. In addition, various light sources such as a laser light source, an LED light source, etc. may be used as the light source 20.

In the example shown in FIG. 1, the measuring object 40b plays a role as a projection surface defining a projection range of the projection device 60. It is preferable that the projection range is within ±50% of the field angle range the detection element 50 can view, that is, the detection range. More preferably the projection range is within ±10%, and further preferably the projection range approximately corresponds to the detection range.

Figure 2:
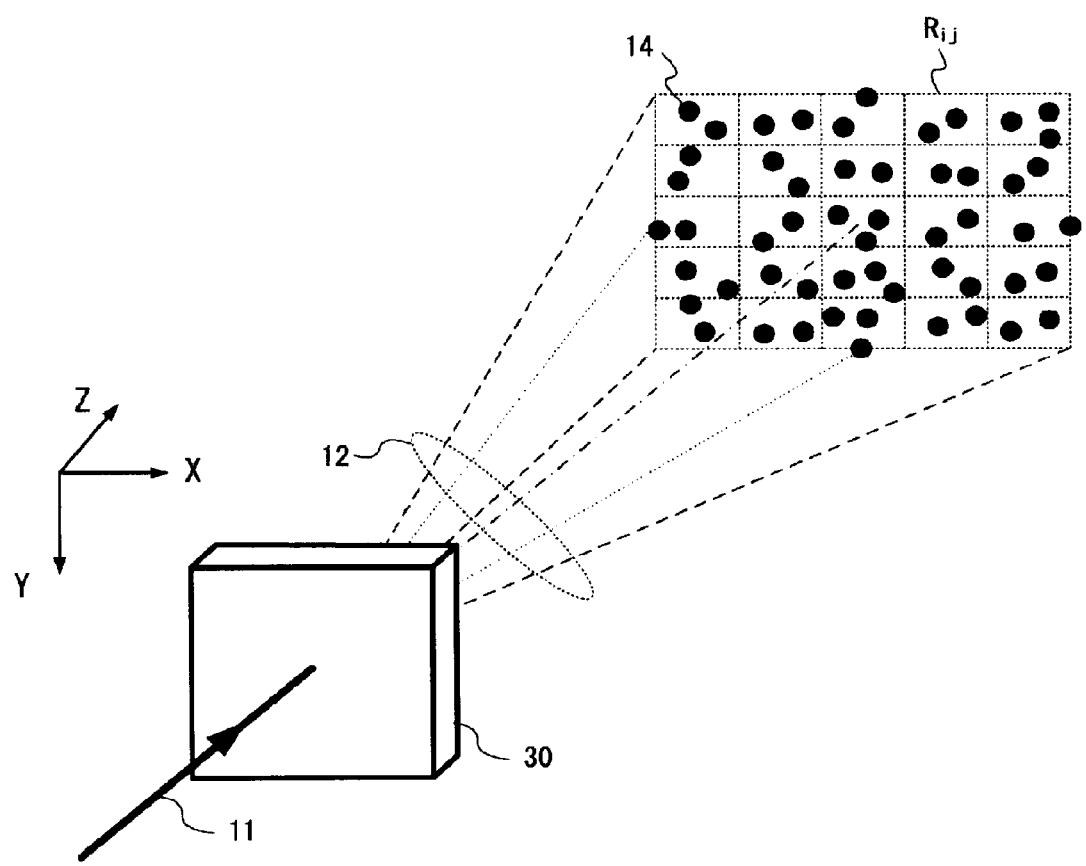
FIG. 2 is an explanatory view showing an example of a light pattern generated by a diffraction optical element 30.

In addition, FIG. 2 is an explanatory view schematically showing the light pattern generated by the diffraction optical element 30. Incidentally, FIG. 2 depicts a main beam of the incident light 11, and a distribution of light spots 14 recognized on the projection surface. When the projection surface is divided into a plurality of regions $R_{ij}$, the distribution density of the light spots 14 caused by the diffracted lights 12 and radiated to each region $R_{ij}$ is preferably within ±50% of the average value of all the regions, and more preferably within ±25%. In this manner, the distribution of the light spots 14 can be made uniform within the projection surface, and measurement can be performed with a smaller variation in each region $R_{ij}$.

Figure 3:
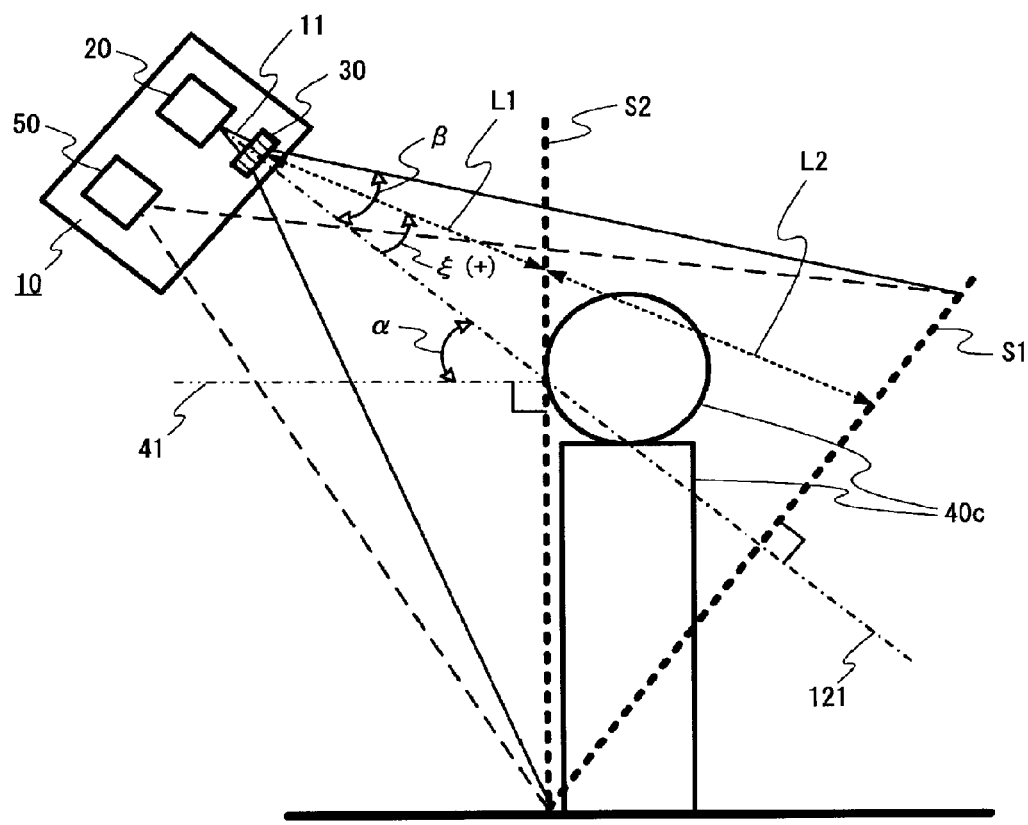
FIG. 3 is an explanatory view showing an example of installation of a measurement device 10.

In addition, FIG. 3 is an explanatory view showing an example of installation of the measurement device 10. The measurement device 10 does not have to be disposed in a position in front of a measuring object. For example, as shown in FIG. 3, it can be also considered that the measurement device 10 is disposed above a measuring object. When measurement on a surface S2 in FIG. 3 is mainly performed thus, it may be preferable that distribution density or light intensity of the light spots 14 is distributed uniformly in a light pattern projected onto the surface S2. In such a case, a slope may be applied to distribution density or light intensity of the light spots 14 in a light pattern projected onto a surface S1 in front of the measurement device 10. That is, the distribution density or the light intensity may be increased or reduced in a certain direction. More specifically, when α designates a tilt angle of the measurement device 10, that is, an angle between an optical axis 121 of a light beam emitted from the measurement device 10 and a normal line 41 of the projection surface S2 where projection is mainly performed, a projection surface S1 whose tilt angle α is 0 is assumed, and the projection surface S1 is divided into a plurality of regions. In this case, the distribution density or the light intensity of diffracted lights forming the light spots 14 may be adjusted so that an average value of light intensity in each region can increase or decrease in a certain direction.

For example, a slope that can be approximated by a function may be used as an example of the slope to be applied to the distribution density or the light intensity of the light spots 14 in the light pattern. For example, the slope may be approximated by a linear function or a quadratic function.

For example, assume that L1 designates a distance to the surface S2 at a desired angle from the optical axis 121 of the light beam emitted from the diffraction optical element 30, and (L1+L2) designates a distance to the surface S1. In this case, when the measurement device has a tile angle α and the light beam emitted from the diffraction optical element 30 has an outgoing angle β as shown in FIG. 3, the following expression (1) is established.

$$L1/(L1+L2)=(1-\tan\alpha\tan\beta)/(1+\tan\alpha\tan\xi) \qquad \text{Expression (1)}$$

The distribution density or the light intensity of the light spots 14 in the light pattern is in inverse proportion to the square of the distance. Accordingly, in this case, it is preferable to perform adjustment so that the distribution density or the light intensity of the light spots 14 on the surface S1 can be proportional to $1/\{(1-\tan\alpha\tan\beta)/(1-\tan\alpha\tan\xi)\}^2$. In addition, the irradiation area may be corrected in consideration of the inclination of the surface S2. That is, adjustment may be performed so that the distribution density or the light intensity of the light spots 14 on the surface S1 can be proportional to $1/\{\cos(\xi-\alpha)\times(1-\tan\alpha\tan\beta)/(1+\tan\alpha\tan\xi)\}^2$.

In addition, when the distribution density or the light intensity of the light spots is set to increase (or decrease) in a certain direction, adjustment may be performed so that the distribution density or the light intensity can increase (or decrease) from the center toward the certain direction and also increase (or decrease) toward the opposite direction thereto.

For example, assume that a measuring object has a shape of a convex surface in which a part located apart from the center in a horizontal direction is disposed at the rear of a part located at the center. In this case, the light irradiation density in the part of the measuring object located at the rear is reduced by the spread of irradiation light. In order to correct the reduction in irradiation density, adjustment may be performed so that the light quantity distribution of light projected onto a surface perpendicular to the optical axis can increase as it goes apart from the center (corresponding to the optical axis) in the horizontal direction. On this occasion, the light quantity distribution in the vertical direction can be made constant.

On the other hand, for example, assume that a measuring object has a shape of a concave surface in which a part located apart from the center in a horizontal direction is disposed in front of a part located at the center. In this case, the light irradiation density in the part of the measuring object located in front is increased by the narrowed spread of irradiation light. In order to correct the increase in irradiation density, adjustment may be performed so that the light quantity distribution of light projected onto a surface perpendicular to the optical axis can decrease as it goes apart from the center (corresponding to the optical axis) in the horizontal direction. On this occasion, the light quantity distribution in the vertical direction can be made constant.

Not only limited to this, but adjustment may be also performed in such a manner that an irradiated surface is set in accordance with the layout of a measuring object and the light quantity distribution is made uniform over the irradiated surface so that a variation in light quantity with which the measuring object is irradiated can be reduced.

Next, the function of the diffraction optical element 30 will be described. The diffraction optical element 30 has at least two functions, that is, a light beam splitting function and a divergence angle converting function. By the light beam splitting function, incident light is split into a plurality of diffracted lights emitted in predetermined directions. By the divergence angle converting function, outgoing light is converted into a light beam having a different divergence angle from that of the incident light.

Figure 4A:
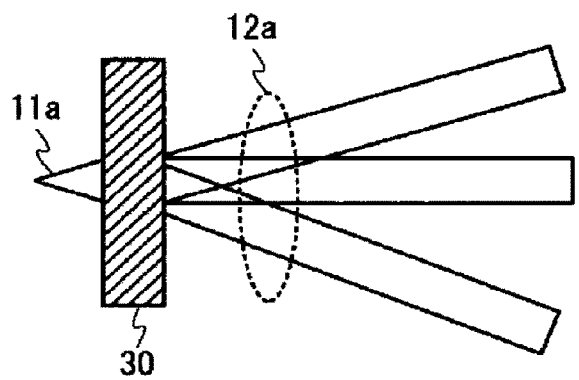
FIG. 4A is an explanatory view schematically showing a function belonging to the diffraction optical element 30.
Figure 4B:
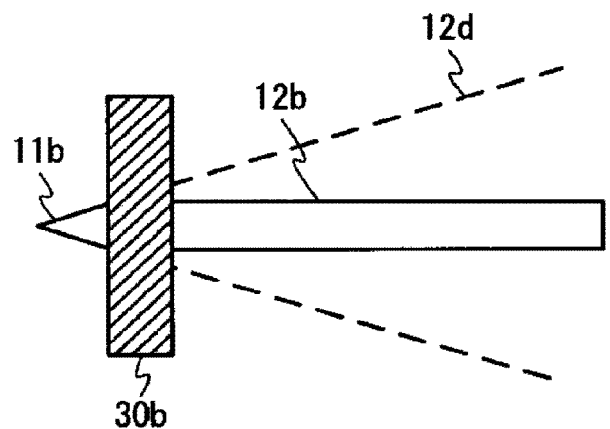
FIG. 4B is an explanatory view schematically showing the function belonging to the diffraction optical element 30.
Figure 4C:
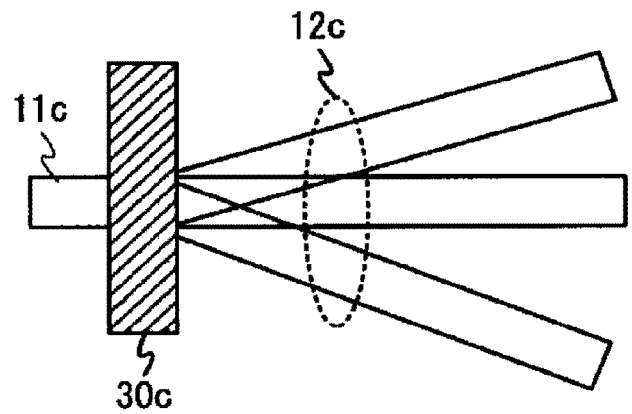
FIG. 4C is an explanatory view schematically showing the function belonging to the diffraction optical element 30.

FIG. 4A is an explanatory view schematically showing an example of the function belonging to the diffraction optical element 30 and composed of the two functions. Incidentally, the function shown in FIG. 4A is a combination of the divergence angle converting function shown in FIG. 4B and the light beam splitting function shown in FIG. 4C. FIG. 4B is a schematic view showing an example of the divergence angle converting function that is a part of the function belonging to the diffraction optical element 30. FIG. 4C is a schematic view showing an example of the light beam splitting function that is a part of the function belonging to the diffraction optical element 30.

As an example of the divergence angle converting function, FIG. 4B shows an example in which, when incident light 11b as divergent light is incident, the incident light 11b whose divergence angle is converted is emitted as diffracted light 12b. On the other hand, as an example of the light beam splitting function, FIG. 4C shows an example in which incident light 11c incident as parallel light is split into a plurality of diffracted lights 12c and the diffracted lights 12c are emitted. The function shown in FIG. 4A is formed as a combination of the divergence angle converting function shown in FIG. 4B and the light beam splitting function shown in FIG. 4C.

The diffraction optical element 30 shown in FIG. 4A splits the incident light 11a as divergent light into a plurality of diffracted lights 12a. At the same time, the diffraction optical element 30 converts the diffracted lights 12a into light beams having different divergence angles from that of the incident light 11a respectively, and emits the light beams. Incidentally, FIG. 4A shows an example in which the diffracted lights 12a are formed as parallel lights respectively while the incident light 11a is divergent light. When the diffracted lights 12a are emitted as parallel lights respectively in this manner, a light pattern in which light spots can be recognized independently of one another on a projection surface can be emitted. Incidentally, the diffracted lights emitted thus are not limited to the parallel lights but may be divergent lights as long as they have a light quantity distribution in which light spots can be recognized independently of one another on a projection surface. Here, the phrase "light spots can be recognized independently of one another" means the condition that the light spots overlap one another in a small area, and the condition that the sum of radii of two of the light spots is smaller than the distance between the centers of the two light spots. Here, the phrase "radius of each light spot" means a distance between the center of the light spot and a position in which the intensity is $1/e^2$ of the intensity at the center of the light spot. Stray light may be generated in another place than desired light spots on a projection surface due to unnecessary diffracted light. In such a case, the stray light whose intensity is generally weak may be visually distinguished from the desired spot lights based on brightness. In addition, an intensity distribution of each spot may be acquired while a certain threshold is set so that light whose intensity is lower than the threshold can be regarded as stray light.

In the divergence angle converting function shown in FIG. 4B, 0th-order diffracted light 12d is emitted as a light beam having the same divergence angle as the incident light 11. The 0th-order diffracted light 12d is projected as a light beam spread on the projection surface. Thus, the light intensity of the 0th-order diffracted light 12d is lowered. Accordingly, the 0th-order diffracted light 12d at any point on the projection surface is lower in light intensity than any other light emitted as parallel light. Such an effect can be obtained in the diffraction optical element 30 shown in FIG. 4A, that is, in the diffraction optical element 30 in which the light beam splitting function has been added. As a result, according to the diffraction optical element 30 in the embodiment, the light intensity of the 0th-order diffracted light in each region $R_{ij}$ on the projection surface can be reduced in comparison with the case where parallel light is incident.

Incidentally, the example shown in FIG. 4A to FIG. 4C is an example in which the diffracted lights 12a, that is, the ±1st-order or higher diffracted lights are emitted as parallel lights to form a light pattern on the projection surface so that light spots can be recognized independently of one another. However, when the change of the divergence angle performed by the divergence angle converting function is adjusted, the whole surface of the projection range can be illuminated. Incidentally, the change of the divergence angle may be adjusted by changing the distance between the light source 20 and the diffraction optical element 30. For example, the projection device 60 may be provided with a drive portion that can change the distance between the light source 20 and the diffraction optical element 30.

Figure 5A:
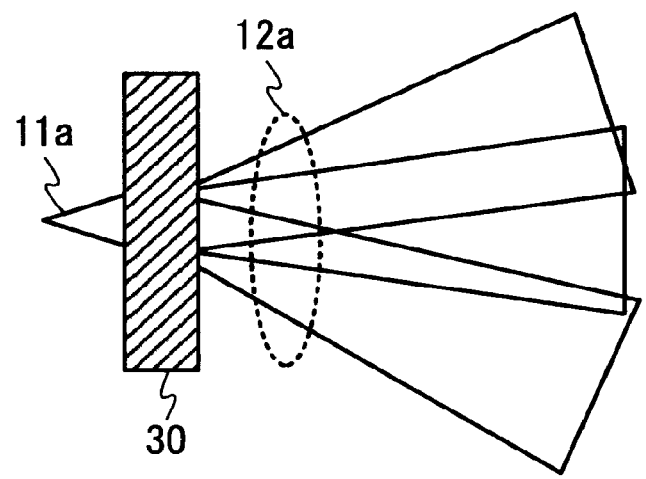
FIG. 5A is an explanatory view schematically showing another example of the function belonging to the diffraction optical element 30.
Figure 5B:
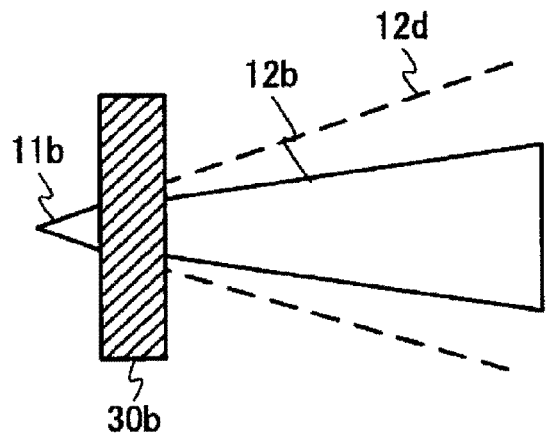
FIG. 5B is an explanatory view schematically showing the example of the function belonging to the diffraction optical element 30.
Figure 5C:
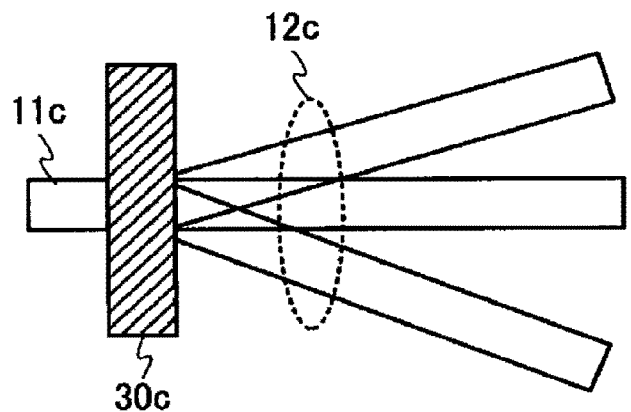
FIG. 5C is an explanatory view schematically showing the example of the function belonging to the diffraction optical element 30.

FIG. 5A is an explanatory view schematically showing another example of the function belonging to the diffraction optical element 30 and composed of the two functions. Incidentally, the function shown in FIG. 5A is a combination of the divergence angle converting function shown in FIG. 5B and the light beam splitting function shown in FIG. 5C. FIG. 5B is a schematic view showing an example of the divergence angle converting function that is a part of the function belonging to the diffraction optical element 30. FIG. 5C is a schematic view showing an example of the light beam splitting function that is a part of the function belonging to the diffraction optical element 30.

As an example of the divergence angle converting function, FIG. 5B shows an example in which, when the incident light 11*b* as divergent light is incident, the incident light 11*b* whose divergence angle is converted is emitted as diffracted light 12*b*. Incidentally, the light beam splitting function shown in FIG. 5C is similar to that of FIG. 4C. The function shown in FIG. 5A is formed as a combination of the divergence angle converting function shown in FIG. 5B and the light beam splitting function shown in FIG. 5C.

Also in the divergence angle converting function shown in FIG. 5B, 0th-order diffracted light 12*d* is emitted as a light beam having the same divergence angle as the incident light 11*b*. Accordingly, the 0th-order diffracted light 12*d* at any point on the projection surface is lower in light intensity than any other light emitted as parallel light. Such an effect can be also obtained in the diffraction optical element 30 in which the light beam splitting function has been added. Accordingly, also in this embodiment, the light intensity of the 0th-order diffracted light generated in each region $R_{ij}$ on the projection surface by the diffraction optical element 30 can be reduced in comparison with the case where parallel light is incident.

In the same manner as in FIG. 4A, the diffraction optical element 30 shown in FIG. 5A splits incident light 11*a* as divergent light into a plurality of diffracted lights 12*a*. At the same time, the diffraction optical element 30 converts the diffracted lights 12*a* into light beams having different divergence angles from that of the incident light 11*a* respectively, and emits the light beams. However, in the example shown in FIG. 5A, each of the diffracted lights 12*a* is formed as divergent light. Further, in the example shown in FIG. 5A, adjacent ones of the diffracted lights 12*a* as divergent lights overlap each other so that the whole of the projection surface can be illuminated.

On this occasion, it is preferable that the divergence angle of each diffracted light 12*a* in FIG. 5A is at least 0.5 times as large as the angle between one of the diffracted lights 12*c* split in FIG. 5C and another around the diffracted light 12*c*. Thus, the whole of the projection surface can be illuminated without any gap. On the other hand, when the divergence angle of each diffracted light 12*a* is too large, the quantity of light emitted out of the projection range increases to reduce the utilization efficiency of light. Accordingly, the divergence angle of each split diffracted light 12*a*, that is, the divergence angle of each diffracted light 12*a* other than the 0th-order diffracted light is preferably not lower than 0.1° and not greater than 5°, and more preferably not lower than 0.5° and not greater than 2.5°.

In addition, in the case of overall irradiation, the average light intensity of the diffracted lights 12 in each region $R_{ij}$ is preferably within ±50% of the average value in all the regions, and more preferably within ±25% of the same. In this manner, the projection surface can be irradiated with light uniformly so that measurement can be performed with a reduced variation in each region $R_{ij}$. In addition, when the detection element 50 uses a lens having a wide angle of view, the intensity of light on the detection element 50 may be reduced in accordance with $\cos^4\xi$ by a cosine fourth-power rule. In such a case, the average light intensity of the diffracted lights 12 in each region $R_{ij}$ may be set within ±50% of a value obtained by multiplying the average value of a region at the center on the detection element 50 by $1/\cos^4\xi$. More preferably the average light intensity of the diffracted lights 12 in each region $R_{ij}$ may be set within ±25% of the value obtained by multiplying the average value of the region at the center on the detection element 50 by $1/\cos^4\xi$.

In addition, when uniform irradiation is performed so that light spots can overlap one another in a desired light pattern as in this example, the density of each diffracted light may increase as it goes apart from the direction of the optical axis in the distribution of the diffracted light in its emission direction. This is because, when diffracted light 12 having the same intensity is projected to a projection surface perpendicular to its optical axis, intensity accumulated in an area of $\cos^4\xi$ with respect to an angle $\xi$ from the emission direction, that is, the optical axis is generally lowered. This depends on the following three factors. First, the ratio between the distance from the diffraction optical element to the position of the optical axis on the projection surface and the distance with which a light beam emitted in the emission direction $\xi$ arrives at the projection surface is expressed by $\cos \xi$, and the density of the light beam is expressed by the square of the ratio, that is, $\cos^2\xi$. Secondly, the area ratio between a surface perpendicular to the emission direction $\xi$ and a surface projected to the projection surface is proportional to $\cos \xi$. Thirdly, according to diffractive optics, in the case where diffracted lights in which an angle between diffracted lights of orders adjacent to each other is substantially uniform are generated, $\sin \xi = m\lambda/P$ is established from the grating equation when $\lambda$ designates the wavelength, m designates the diffraction order and P designates the cycle pitch of the light beam splitting function. Therefore, an angle interval $\Delta\xi$ between one order and the next order in the diffracted lights can be obtained from $\sin(\xi+\Delta\xi)=(m+1)\lambda/P$. When secondary or more items of $\Delta\xi$ are ignored, the aforementioned equation can be approximated as $\sin \xi + \Delta\xi \cos \xi = (m+1)\lambda/P$. When a difference from the original equation is taken, $\Delta\xi = \lambda/P/\cos \xi$ is established. Accordingly, the diffraction angle near the angle $\xi$ is $1/\cos \xi$ times as large as the angle interval $\Delta\xi = \lambda/P$ of diffracted lights near the center. Thus, the density decreases in proportion to $\cos \xi$ accordingly.

Accordingly, when the aforementioned influence cannot be ignored, the light intensity of each diffracted light 12 must be designed to increase as it approaches a peripheral portion of the projection range. However, when the emission angle of the diffracted light 12 increases, the actual light intensity of the diffracted light may be lower than the design light intensity. In such a case, the method for splitting the diffracted light may be adjusted so that the density of the diffracted light 12 can increase in the periphery of the projection range. Thus, the average light quantity in a certain area can be increased in the peripheral portion of the projection surface. This point can be also applied to the case where the projection surface is inclined with respect to the optical axis.

When the two functions, that is, the divergence angle converting function and the light beam splitting function are combined as described above, not only is it possible to convert each split diffracted light into parallel light or a light beam with a small divergence angle and emit the parallel light or the light beam, but it is also possible to emit 0th-order diffracted light as divergent light so that the light quantity of the 0th-order diffracted light can be reduced in each region. However, when the light quantity of the 0th-order diffracted light is originally too large, the light intensity thereof on the projection surface may be large even when the 0th-order diffracted light is emitted as divergent light. Therefore, the ratio of the light quantity of the generated 0th-order diffracted light to the light quantity of incident light is preferably not greater than 5%, and more preferably not greater than 1%. In addition, when the divergence angle of the incident light is small, the spread of the 0th-order diffracted light on the projection surface is reduced. Therefore, the divergence angle of the incident light is preferably not lower than 1°, and more preferably not lower than 5°. Accordingly, it is preferable that a light beam having a divergence angle of 1° or more can be made into a parallel light beam by the divergence angle converting function. It is more preferable that a light beam having a divergence angle of 5° or more can be made into a parallel light beam.

Figure 6A:
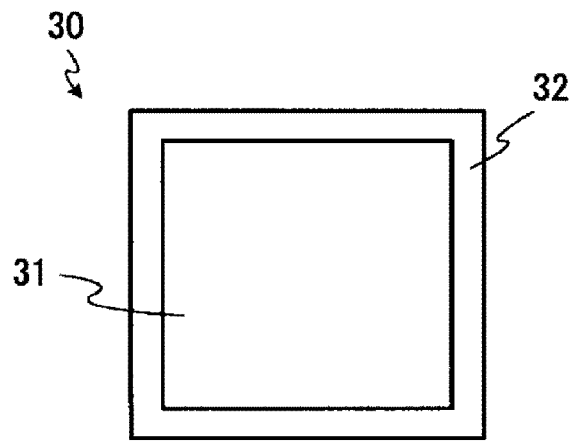
FIG. 6A is a view schematically showing an example of the configuration of the diffraction optical element 30.
Figure 6B:
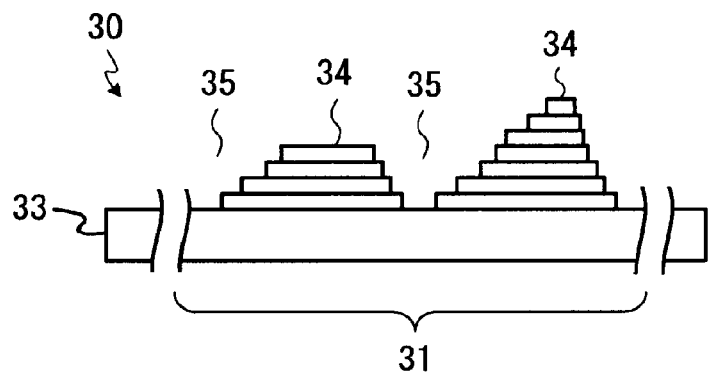
FIG. 6B is a view schematically showing the example of the configuration of the diffraction optical element 30.

FIG. 6A and FIG. 6B are views schematically showing an example of the configuration of the diffraction optical element 30. Incidentally, FIG. 6A is a schematic plan view showing the example of the configuration of the diffraction optical element 30, and FIG. 6B is a schematic sectional view showing the example of the configuration of the diffraction optical element 30. The diffraction optical element 30 according to the embodiment has a diffraction portion 31 for emitting a predetermined light pattern based on a diffraction effect. More specifically, the diffraction portion 31 is provided so that a phase distribution expressing a diffraction effect to split the incident light 11 into a plurality of diffracted lights 12 for generating a predetermined light pattern can be given to the incident light 11. The diffraction portion 31 may be disposed all over the element surface or may be designed to have a peripheral portion 32 as shown in FIG. 6A. In the case of the configuration in which the peripheral portion 32 is provided, the incident light 11 transmitted through the peripheral portion 32 may be emitted into the light pattern as stray light. It is therefore preferable that the peripheral portion 32 is shielded from light by a light shielding material, or another diffraction portion, a diffusion portion or the like is provided to diffract or diffuse light to thereby prevent the projection range from being irradiated with intensive stray light. In addition, in the case where the peripheral portion 32 is designed to transmit light straightly, it is preferable that the diffraction portion 31 is made much larger than the diameter of an incident light beam, so that the peripheral portion 32 can be prevented from being irradiated with light. Further, a light shielding frame for shielding light transmitted by the peripheral portion 32 may be attached to the diffraction optical element 30 so as to prevent stray light from occurring.

As shown in FIG. 6B, an concavity and convexity pattern made of two or more stages of concavities and convexities is formed in the diffraction portion 31. A diffraction effect is generated by a phase distribution caused by the concavities and convexities belonging to the concavity and convexity pattern. FIG. 6B shows an example of the diffraction optical element 30 in which a plurality of convex portions 34 or concave portions 35 are formed in a surface of a transparent member 33 such as a glass substrate so as to form an concavity and convexity pattern made of two or more stages of concavities and convexities as a whole.

Incidentally, the diffraction optical element 30 may have any structure as long as it can generate a phase distribution. The structure is not limited to the structure in which the concavity and convexity pattern is formed in the surface of the transparent member 33, but may be a structure in which a member having a different refractive index from that of the transparent member 33 having the concavity and convexity pattern formed therein is pasted onto the member 33 and the surface thereof is made flat, or further may be a structure in which the refractive index is varied in the transparent member 33. That is, the concavity and convexity pattern here is not limited only to a pattern meaning a structure whose surface shape is a concavity and convexity, but may include any structure that can give a phase distribution to incident light.

In addition, the phase here indicates a phase of light and a phase item in an electric field of light. The phase of light is obtained by multiplying an optical path difference $\Delta L$ based on a certain point by $2\pi/\lambda$. The optical path difference $\Delta L$ occurs when light is passing through concavities and convexities between two media having different refractive indexes or a medium in which there is a distribution in refractive index. For example, assume that concavities and convexities are formed by a combination of two media with a refractive index difference of $\Delta n$. When the height of a convex portion made of one of the media at coordinates (x, y) is expressed by d(x, y), the optical path difference at the coordinates (x, y) can be obtained as $\Delta L(x, y)=\Delta n d(x, y)$. On the other hand, when light is passing through a medium with thickness d and a refractive index distribution $\Delta n(x, y)$ is provided within the surface of the medium, the optical path difference at each coordinate position within the surface can be obtained as $\Delta L(x, y)=\Delta n(x, y)d$. In addition, a phase in which $2\pi$ is added to a phase item of cosine or sine can be regarded as identical to its original phase, as will be described below about superimposition of phases. Therefore, when two phases are superimposed on each other and the value of those exceeds $2\pi$, the remainder of dividing the value by $2\pi$ may be calculated. The optical path difference can be designed so that the value of the remainder can satisfy $2\pi\Delta L/\lambda$.

Figure 7A:
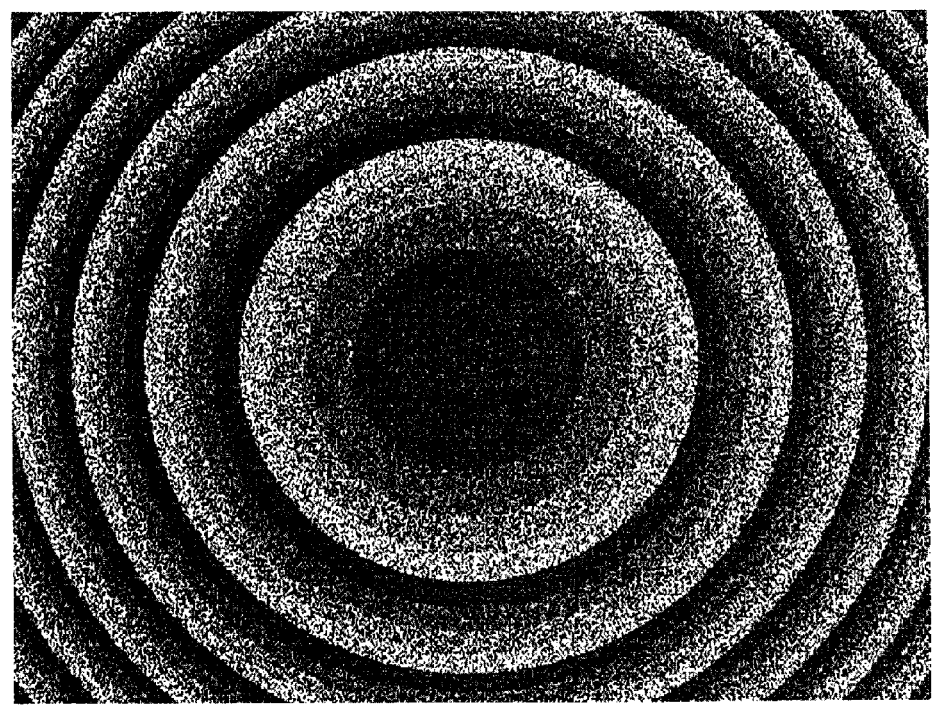
FIG. 7A is an explanatory view showing an example of the shape of concavities and convexities formed in a diffraction portion 31.

Next, the shape of the concavities and convexities formed in the diffraction portion 31 of the diffraction optical element 30 will be described with reference to FIG. 7A to FIG. 7C. FIG. 7A is an explanatory view showing an example of the shape of the concavities and convexities formed in the diffraction portion 31. FIG. 7A is an explanatory view in which a part of the shape of the concavities and convexities formed in the diffraction portion 31 is shown by a monochromatic image of eight gradations. Incidentally, in FIG. 7A, each black portion designates a convex portion 34, and each white portion designates a bottom side of a concave portion 35, that is, a lowest portion. In addition, a darker black portion expresses a convex portion 34 having a larger number of stages. In the shape of the concavities and convexities shown in FIG. 7A, a phase distribution obtained by superimposition of a phase expressing a divergence angle converting function shown in FIG. 7B and a phase expressing a light beam splitting function shown in FIG. 7C is converted into a concavity and convexity shape. Incidentally, the conversion from the phase distribution to the concavity and convexity shape may be performed by obtaining height of concavities and convexities required at each coordinate position based on a phase border indicated by the phase distribution and the refractive index of the medium.

Figure 7B:
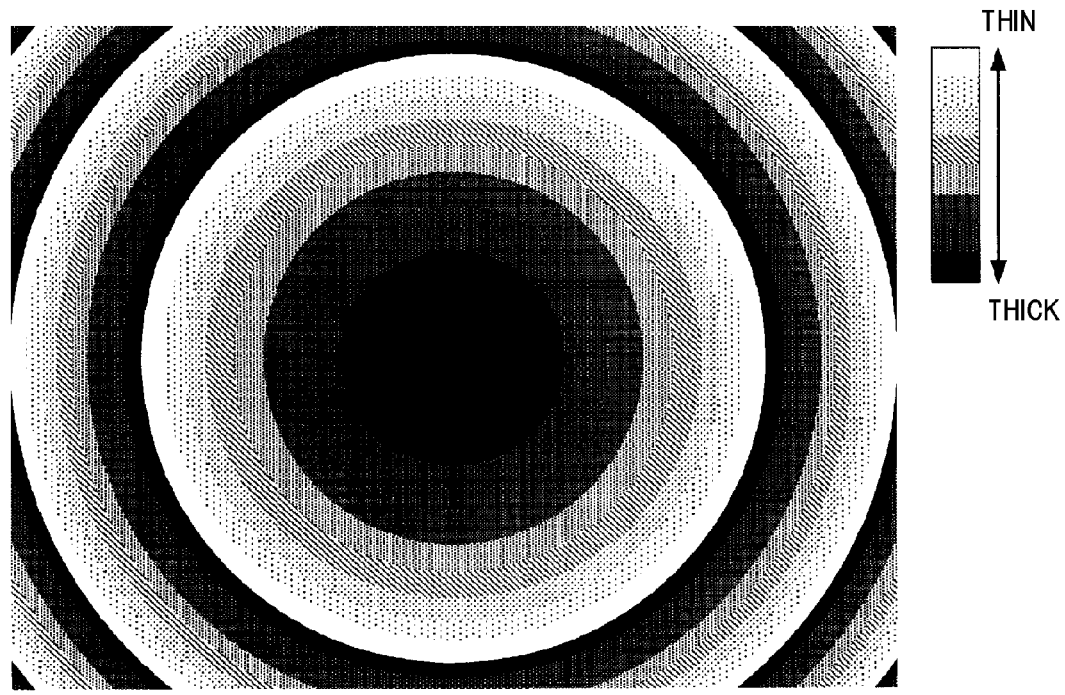
FIG. 7B is an explanatory view schematically showing a phase distribution expressing a divergence angle converting function.
Figure 7C:
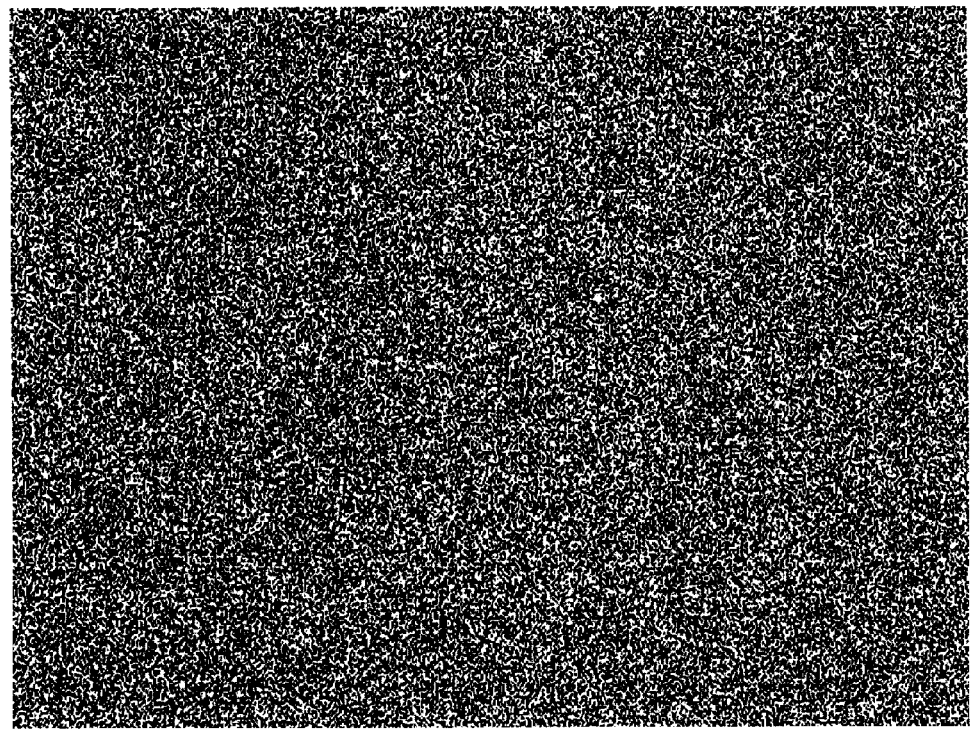
FIG. 7C is an explanatory view schematically showing a phase distribution expressing a light beam splitting function.

FIG. 7B is an explanatory view in which the distribution of the phase expressing the divergence angle converting function is expressed by eight gradations. The phase expressing the divergence angle converting function is one of the phases superimposed on each other. Incidentally, in FIG. 7B, the magnitude of the phase is expressed by density of meshing. Darker meshing expresses a larger phase difference from a while portion. As shown in FIG. 7B, the distribution of the phase expressing the divergence angle converting function may be a phase distribution expressed by a Fresnel-shaped diffractive lens. The distribution of the phase expressing the divergence angle converting function will be referred to as phase distribution $\varphi_1$.

The phase distribution $\varphi_1$ is a phase distribution expressed by a lens function. The phase distribution $\varphi_1$ is typically expressed by a phase function. For example, when the phase distribution $\varphi_1$ is rotationally symmetric, the phase distribution $\varphi_1$ is expressed by a phase function shown in the following expression (2).

[Numeric 1]

$$\phi_1 = \sum_i a_i r^{2i} + A \qquad \text{Expression (2)}$$

In the expression (2), $a_i$ designates a coefficient of the phase function, r designates a distance from the center, and A designates a constant item. Incidentally, when an aberration component such as astigmatism is provided in a phase distribution to be generated, the phase distribution $\varphi_1$ is not rotationally symmetric. In that case, the phase distribution $\varphi_1$ can be expressed by a phase function using a polynomial expression of x and y within xy coordinates as shown in the following expression (3). In the expression (3), $b_i$ designates a coefficient of the phase function, and B designates a constant item. Here, the position of r=0 in the phase function shown in the expression (2) or the position of (x, y)=(0, 0) in the expression (3) will be referred to as phase center. Designing is performed so that the position of the optical axis of incident light in the diffraction optical element 30 can be aligned with the phase center.

[Numeric 2]

$$\varphi_1 = b_1 x + b_2 y + b_3 x^2 + b_4 xy + b_5 y^2 + \ldots + B \qquad \text{Expression (3)}$$

Assume that $q_i$ and $q_o$ designate unit vectors in incident and outgoing directions respectively, $\epsilon$ designates a normal vector of a border at an incident point, $n_i$ designate a refractive index of an incident medium, and $n_o$ designates a refractive index of an outgoing medium. Since a relational expression shown by the following expression (4) is established, rays can be traced using the expression (4).

[Numeric 3]

$$n_0(q_o \times \epsilon) = n_i(q_i \times \epsilon) + m\lambda/2\pi \cdot (\nabla \varphi_1 \times \epsilon) \qquad \text{Expression (4)}$$

Accordingly, the phase distribution $\varphi_1$ can be obtained when a Fresnel-shaped diffractive lens is designed by a ray tracing method to obtain a phase function. Incidentally, in the expression (4), m designates a diffraction order of diffracted light, and the operator "×" designates a vector product. In addition, in order to convert (quantize) the phase function into a concavity and convexity shape, the remainder of dividing the phase function by $2\pi$ may be set at a value obtained by multiplying an optical path difference generated due to concavities and convexities by $2\pi/\lambda$. Here, $\lambda$ designates the wavelength of light.

In addition, a pitch P(r), which is an interval of convex portions in the Fresnel-shaped diffractive lens, can be calculated approximately by the following expression (5). Accordingly, when the Fresnel-shaped diffractive lens is formed into an N-level pseudo-blazed shape of N-levels, the processing width at a position r can be approximated by P(r)/N.

[Numeric 4]

$$P(r) = 2\pi/|\nabla \varphi_1| \qquad \text{Expression (5)}$$

FIG. 7C is an explanatory view in which the distribution of the phase expressing the light beam splitting function, which is the other phase of the phases superimposed on each other, is expressed by a binary image. As shown in FIG. 7C, the distribution of the phase expressing the light beam splitting function may be a distribution of a phase expressed by a splitting diffraction optical element, that is, a diffraction optical element emitting a light beam having a plurality of main rays when light is incident thereon. More specifically, the distribution may be a distribution of a phase expressed by a splitting diffraction optical element designed so that an emitted light beam can be split into a plurality of diffracted lights to thereby irradiate a predetermined projection surface with a desired light pattern. The distribution of the phase expressing the light beam splitting function will be referred to as phase distribution $\varphi_2$.

The phase distribution $\varphi_2$ can be obtained by a splitting diffraction optical element designed so that diffracted lights of some orders can be emitted in an emission direction of a desired light pattern. On this occasion, for example, if the intensity of each diffracted light is adjusted, the light quantity distribution on the projection surface can be changed. In addition to the adjustment of intensity of each diffracted light, the light quantity distribution on the projection surface can be also changed if the density of light emitted within a certain emission angle range is adjusted independently of the adjustment of the intensity of each diffracted light. Incidentally, an example of a specific method for obtaining the phase distribution $\varphi_2$ may include a method using an iterative Fourier transform method described in the literature by Bernard Kress and Patrick Meyrueis, "Digital Diffractive Optics", Maruzen, 2005. That is, the phase distribution $\varphi_2$ may be obtained in the following manner. A blackening degree distribution or a light intensity distribution is set on a projection surface. A phase distribution is calculated using an iterative Fourier transform method so that the blackening degree distribution or the light intensity distribution set thus can be obtained. When the phase distribution $\varphi_2$ is obtained in the diffraction optical element 30 according to the embodiment, the positions of light spots 14 to be projected onto the projection surface may be, for example, reflected on the blackening degree distribution or the light intensity distribution, while iterative Fourier transform is performed using, as parameter, the density of a light beam traveling in each direction or the light intensity of each light beam. Incidentally, although FIG. 7C shows an example in which the phase distribution $\varphi_2$ is expressed by binary phase, the phase expressed by the phase distribution $\varphi_2$ may be ternary or more. That is, when the phase distribution $\varphi_2$ is converted into a concavity and convexity shape, the concavity and convexity shape is not limited to concavities and convexities of two stages but may include concavities and convexities of three or more stages. According to the aforementioned method for designing a splitting diffraction optical element, that is, according to the method for performing iterative Fourier transform using, as parameter, the density of a light beam traveling in each direction or the light intensity of each light beam while the positions of light spots 14 to be projected onto the projection surface are reflected on the blackening degree distribution or the light intensity distribution, the light pattern can be set desirably. Thus, a diffraction optical element that can emit a light pattern having a desired light quantity distribution on a predetermined projection surface can be obtained easily. For example, it is also possible to easily obtain a diffraction optical element for emitting a light pattern in which the average value of the light quantity in each region in a projection surface perpendicular to the optical axis of emitted 0th-order light increases or decreases in a certain direction. Incidentally, the aforementioned method for designing a splitting diffraction optical element can be suitably applied to any diffraction optical element other than the diffraction optical element 30 according to the embodiment as long as the diffraction optical element is intended to irradiate a predetermined projection surface with a predetermined light pattern using a light beam splitting function.

In the shape of concavities and convexities in the diffraction portion 31 shown in FIG. 7A, a phase distribution obtained by superimposition of the phase expressed by the phase distribution $\varphi_1$ and the phase expressed by the phase distribution $\varphi_2$ is converted into a concavity and convexity shape. When the phase distribution expressed by the shape of the concavities and convexities in the diffraction portion 31 is $\varphi$, the phase distribution $\varphi$ can be expressed as $\varphi=\varphi_1+\varphi_2$. It is noted in the phase distribution $\varphi$ that a phase whose value exceeds $2\pi$ as a result of the superimposition of the two phases is regarded as a value of a remainder of dividing the phase by $2\pi$ as described previously. Accordingly, the shape of the concavities and convexities in the diffraction portion 31 may be set so that the remainder of dividing $\varphi_1+\varphi_2$ by $2\pi$ at each point within the surface can be set at a value obtained by multiplying an optical path difference generated due to the concavities and convexities in the diffraction portion 31 by $2\pi/\lambda$ ($\lambda$ designates the wavelength of incident light).

However, in the phase distribution $\varphi_1$, which is a distribution of the phase expressed by the divergence angle converting function, the pitch P(r) generally decreases as it goes away from the center of the element. Particularly, when the divergence angle of the incident angle is large, P(r)/N serving as processing width in the concavity and convexity shape may be too small. When the processing width is too small, processing cannot be performed, or if processing can be performed, the processed shape may be poor to cause unnecessary stray light.

Figure 8A:
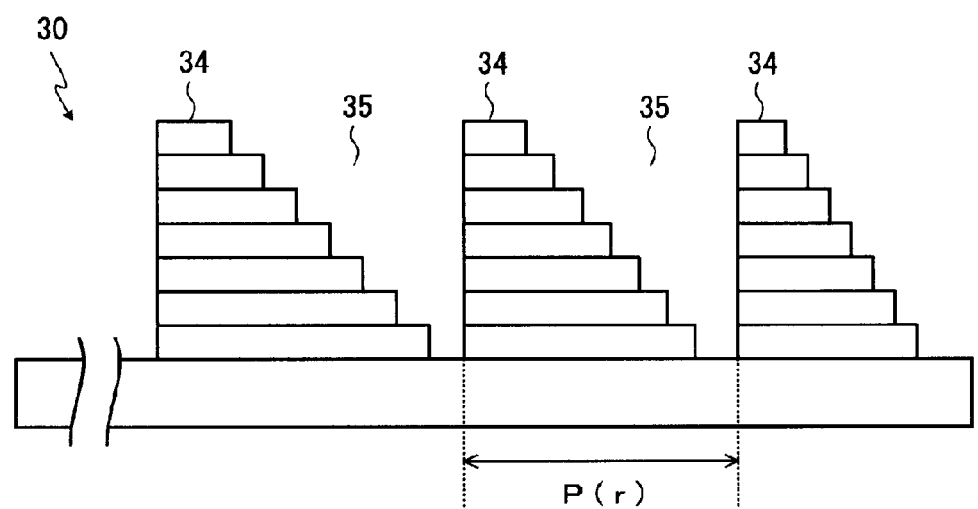
FIG. 8A is an explanatory view showing an example in which processing width is adjusted in an concavity and convexity shape corresponding to a phase distribution $\varphi_1$.
Figure 8B:
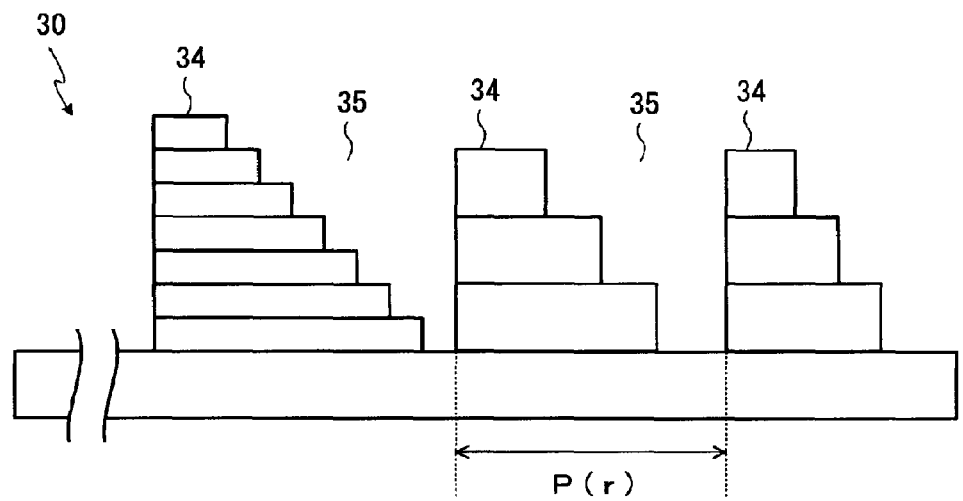
FIG. 8B is an explanatory view showing the example in which the processing width is adjusted in the concavity and convexity shape corresponding to the phase distribution $\varphi_1$.

As a solution to such a case, the number of stages N of pseudo-blaze may be reduced when P(r)/N is smaller than a threshold D. FIGS. 8A and 8B are explanatory views showing an example in which the number of stages N of pseudo-blaze as a concavity and convexity shape corresponding to the phase distribution $\varphi_1$ is reduced near a peripheral portion to thereby adjust the processing width. Incidentally, FIG. 8A is a sectional view schematically showing the shape of concavities and convexities corresponding to the phase distribution $\varphi_1$ before the processing width is adjusted, and FIG. 8B is a sectional view schematically showing the shape of concavities and convexities corresponding to the phase distribution $\varphi_1$ after the processing width has been adjusted.

As shown in FIG. 8B, when P(r)/N obtained as the processing width near the peripheral portion is smaller than the threshold D, the number of stages N of pseudo-blaze may be reduced. FIG. 8B shows an example in which the concavity and convexity shape near the peripheral portion has been changed from pseudo-blaze of eight stages, in which the bottom side part of each concave portion 35 is used as the lowest one of the eight stages, to pseudo-blaze of four stages. Specifically in order to reduce the number of stages N of pseudo-blaze, the number of gradations expressing the phase in a corresponding resin may be reduced in the phase distribution $\varphi_1$.

The value of the threshold D may be, for example, set to be not greater than 2 μm. Incidentally, the diffraction efficiency generally increases as the number of stages of pseudo-blaze is larger. Therefore, the threshold D is more preferably not greater than 1 μm, and further more preferably not greater than 0.5 μm. When the processing width is adjusted in this manner, the concavity and convexity shape in the diffraction portion 31 after the superimposition can be made into a processable shape.

Figure 9A:
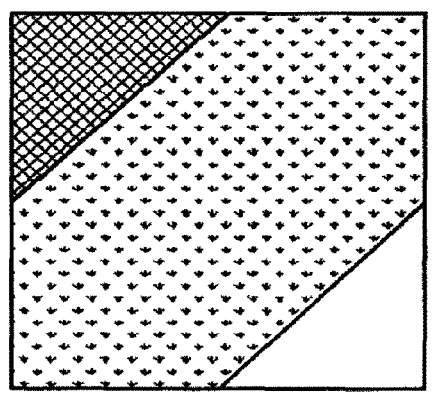
FIG. 9A is an explanatory view showing an example in which a border of each phases is adjusted when two phases are superimposed on each other.
Figure 9B:
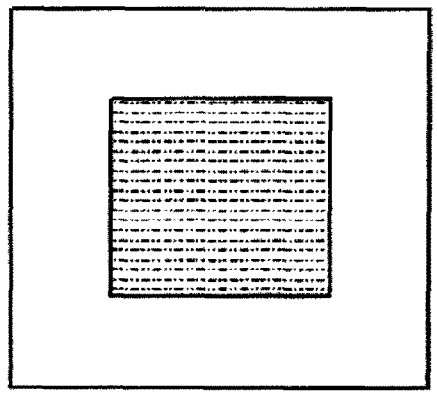
FIG. 9B is an explanatory view showing the example in which the border of each phase is adjusted when the two phases are superimposed on each other.
Figure 9C:
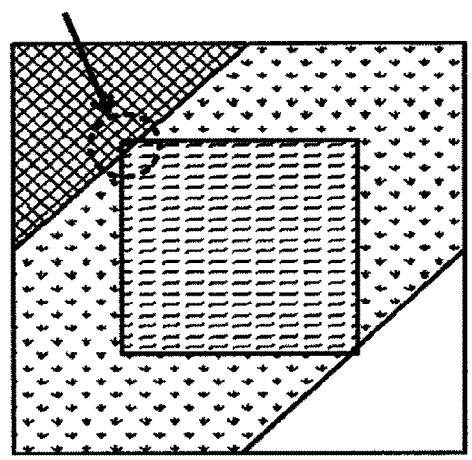
FIG. 9C is an explanatory view showing the example in which the border of each phase is adjusted when the two phases are superimposed on each other.

In addition, there may arise another processing problem than the aforementioned problem. That is, as a result of the superimposition of the phase expressed by the phase distribution $\varphi_1$ and the phase expressed by the phase distribution $\varphi_2$, a region with a small processing width may occur in the phase distribution $\varphi$ in the diffraction portion 31. Such an example is shown in FIG. 9A to FIG. 9C. FIG. 9A is a schematic view in which a part of the distribution of the phase expressed by the phase distribution $\varphi_1$ is cut out and depicted. FIG. 9B is a schematic view showing the distribution of the phase expressed by the phase distribution $\varphi_2$ in the same region as FIG. 9A. Incidentally, in FIG. 9A to FIG. 9F, regions expressed in different meshing manners show they have different phases.

Figure 9D:
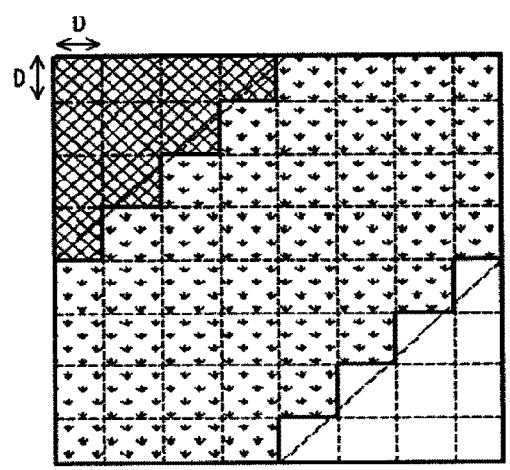
FIG. 9D is an explanatory view showing the example in which the border of each phase is adjusted when the two phases are superimposed on each other.
Figure 9E:
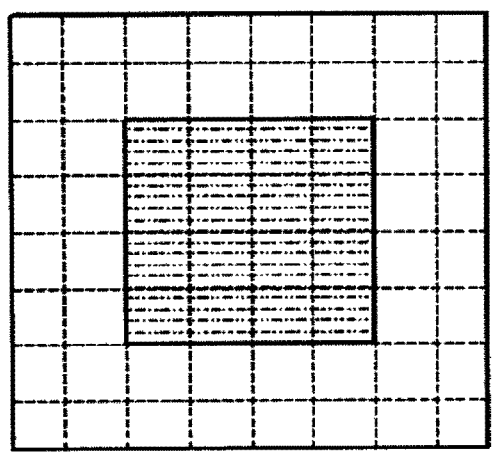
FIG. 9E is an explanatory view showing the example in which the border of each phase is adjusted when the two phases are superimposed on each other.
Figure 9F:
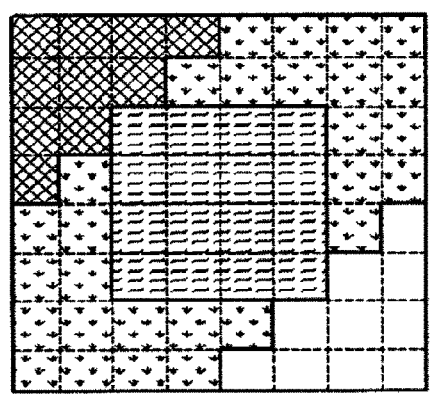
FIG. 9F is an explanatory view showing the example in which the border of each phase is adjusted when the two phases are superimposed on each other.

FIG. 9C is a schematic view showing a distribution of the phase obtained by superimposition of the phase shown in FIG. 9A and the phase shown in FIG. 9B. The phase shown in FIG. 9C is expressed by the diffraction portion 31. Each region designated by arrows in FIG. 9C is an example of a region in which the width of the concavity and convexity shape has been smaller than a processable width as a result of the superimposition of the two phases. Such a region may cause deterioration in processed shape. Thus, it is preferable that such a region is absent. In order to reduce such a region, when the two phases are superimposed, processing to share the border between the two phases may be performed, for example, as shown in FIG. 9D to FIG. 9F. As a method for sharing borders of the phases, for example, the phase in each phase distribution may be approximated to a mesh region of a processable polyhedron shape. Specifically in each phase distribution, the phase distribution may be changed so that the borders of the phases can be put on a mesh side of a mesh region set to be shared. Thus, the borders of the two phases can be shared. In the example shown in FIG. 9D, the phase shown in FIG. 9A is approximated using a rectangular mesh region whose one side length is the threshold D of processing width. On the other hand, in the example shown in FIG. 9E, the phase shown in FIG. 9B is approximated using the same mesh region. When the borders of the phases are aligned between the phase distributions and the two phases are superimposed on each other, a region whose processing width is small can be eliminated as shown in FIG. 9F. On this occasion, the border in one of the phase distributions may be adjusted to the border in the other phase distribution. For example, a mesh region is set in accordance with the board of the phase expressed by the phase distribution $\varphi_2$ shown in FIG. 9E. After that, the phase expressed by the phase distribution $\varphi_1$ shown in FIG. 9D is approximated in each position of the mesh region.

When the mesh size in the mesh region, that is, the size of one side of an individual mesh is large, the approximation of the phase deteriorates to cause unnecessary diffracted light. It is therefore preferable that the mesh size is not greater than 1 μm. When processing is performed in a step using photolithography, the borders of the two phases may be shared on a photomask for use in the photolithography. That is, a pattern shape formed on the photomask may be approximated using a mesh region.

Incidentally, the aforementioned description shows an example for forming the concavity and convexity pattern in which the phase distribution $\varphi$ obtained by superimposition of the phase expressing the divergence angle converting function and the phase expressing the light beam splitting function is converted into a concavity and convexity shape on one surface of the transparent member 33. However, the phases are not superimposed, but a concavity and convexity pattern in which the distribution of the phase expressing the divergence angle converting function is converted into a concavity and convexity shape may be formed in one surface while the distribution of the phase expressing the light beam splitting function is converted into a concavity and convexity shape is formed in the other surface. Incidentally, on that occasion, the concavity and convexity patterns are disposed so that the divergence angle converting function can be expressed after the light beam splitting function. That is, the concavity and convexity pattern in which the distribution of the phase expressing the light beam splitting function is converted into an concavity and convexity shape is formed on the incident side, and the concavity and convexity pattern in which the distribution of the phase expressing the divergence angle converting function is converted into a concavity and convexity shape is formed on the outgoing side.

EXAMPLES

Example 1

A first example is an example of the diffraction optical element 30 in which a plurality of diffracted lights as parallel lights are emitted in response to incident light as divergent light so that a predetermined light pattern can be projected onto a projection surface.

Ray tracing calculation is applied to a Fresnel-shaped diffractive lens by which light from a light emitting point located at a distance of 5 mm could be made into parallel light. As a result, values shown in the following Table 1 are obtained as coefficients of the phase function shown in the expression (2).

the phase expressed by the phase distribution $\varphi_1$ is set as a phase of pseudo-blaze of eight stages based on the obtained coefficients of the phase function. That is, N=8. However, in a region where the value of P(r)/N serving as processing with is not greater than 400 nm in the case of the pseudo-blaze of eight stages, the phase is set as a phase of pseudo-blaze of four stages so that the processing width can exceed 400 nm.

Figure 10:
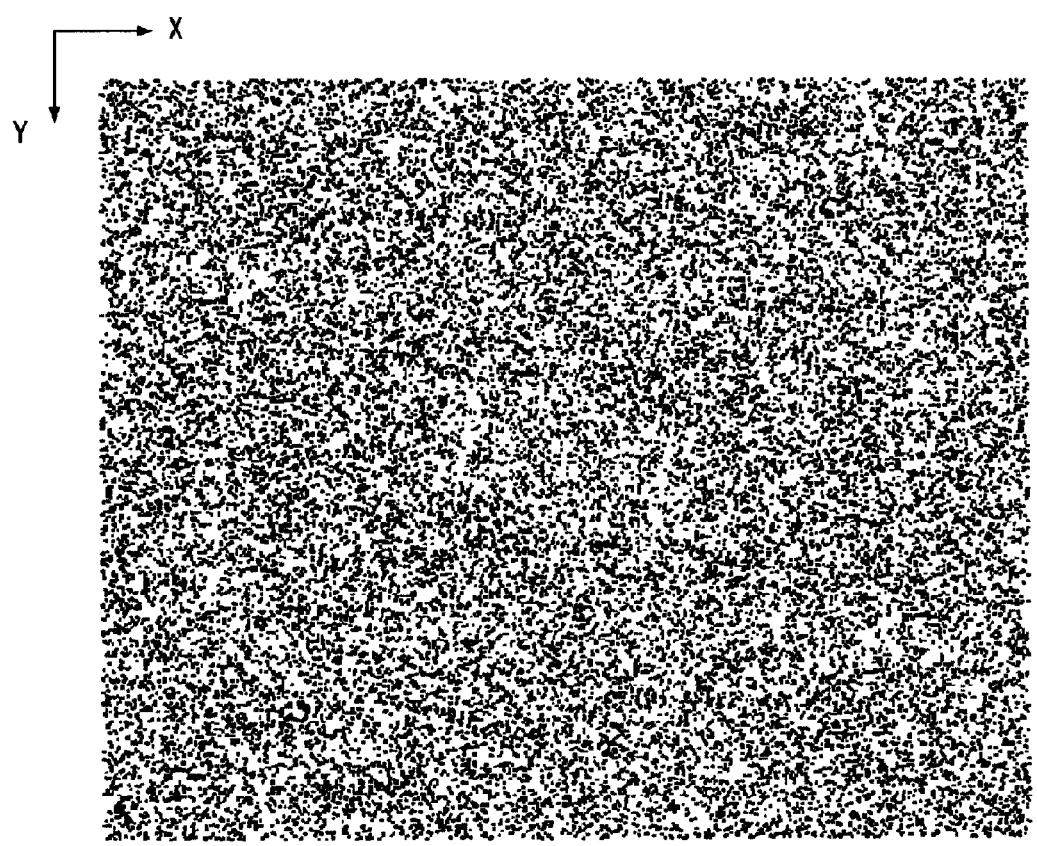
FIG. 10 is an explanatory view showing a light pattern on a projection surface, the light pattern being generated by a diffraction optical element 30 in a first example.
Figure 11:
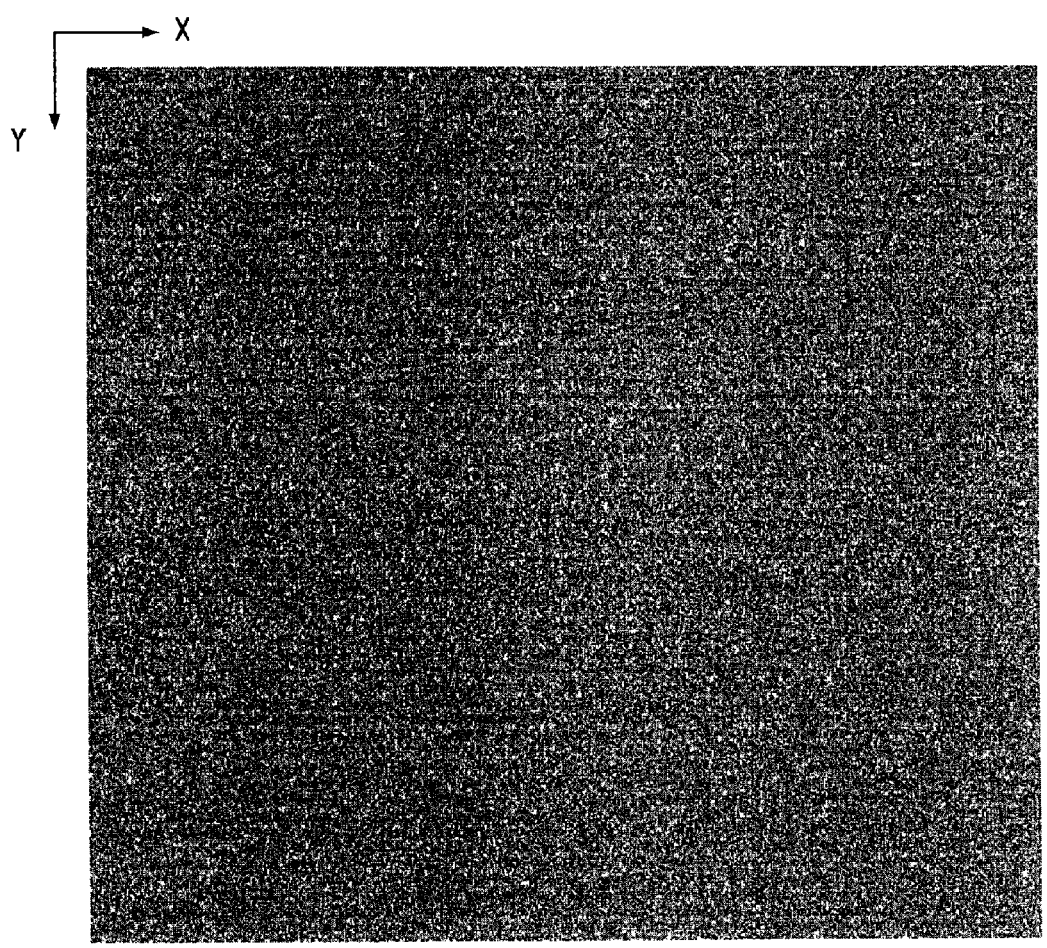
FIG. 11 is an explanatory view schematically showing a phase distribution expressing a light beam splitting function of the diffraction optical element 30 in the first example.

Next, using iterative Fourier transform, calculation was performed on the phase distribution of a splitting diffraction optical element in which diffracted lights could be emitted in response to parallel light incident thereon so that a light pattern on a projection surface could be obtained as a pattern shown in FIG. 10. As a result, the phase distribution shown in FIG. 11 was obtained. Incidentally, FIG. 10 shows a light pattern formed by 200,000 light spots projected in a range of horizontally ±40.2° and vertically ±32.4° from the optical axis. On the other hand, FIG. 11 shows a phase distribution in a region 1 mm square. Incidentally, though hard to see due to the resolution of the image, the phase distribution shown in FIG. 11 is a binary phase distribution. The phase distribution shown in FIG. 11 and disposed at a pitch of 1 mm and within a plane measuring 3 mm by 6 mm is regarded as phase distribution $\varphi_2$.

Next, the phase expressed by the phase distribution $\varphi_1$ and the phase expressed by the phase distribution $\varphi_2$ is superimposed on each other to obtain a phase distribution $\varphi$ to be expressed by the diffraction portion 31. The obtained phase distribution $\varphi$ is converted into a concavity and convexity shape to obtain the concavity and convexity shape of the diffraction portion 31. In this example, obtained is a concavity and convexity shape in which each stage is 230 nm high and the maximum number of stages is eight.

A quartz glass 0.525 mm thick is washed, and photolithography and etching are then repeated. Thus, the quartz glass is processed so that the surface can be formed into the aforementioned concavity and convexity shape. In this manner, an concavity and convexity pattern made of concavities and convexities in which each stage is 230 nm high and the maximum number of stages is eight is formed in the surface of the quartz glass.

An outer circumferential portion of an element measuring 3 mm by 6 mm is fixed by an opaque frame, and the element is irradiated with laser light of 850 nm from a light emitting point located at a distance of 5 mm from the element. Outgoing light from the element is formed as a group of diffracted lights that are parallel lights. A light pattern is projected onto a projection surface as shown in FIG. 10. Incidentally, FWHM (Full Width at Half Maximum) of a spread angle of a light beam from a laser light source is 10° horizontally and 30° vertically.

TABLE 1

| $a_1$ | $a_2$ | $a_3$ | $a_4$ | $a_5$ | $a_6$ | $a_7$ | $a_8$ | A |
|---|---|---|---|---|---|---|---|---|
| −739.197 | 7.390517 | −0.14686 | 0.003356 | −3.7E−05 | −4.3E−06 | 3.56E−07 | −9.4E−09 | −3.14159 |

According to the phase distribution $\varphi_1$ expressed by the phase function including the coefficients whose values are shown in Table 1, a light beam with an incident angle of 31° in a position at a distance of 3 mm from the optical axis can be made into parallel light, and a light beam with an incident angle of 16.7° in a position at a distance of 1.5 mm from the optical axis can be made into parallel light. In this example, On the aforementioned incident conditions, the diffraction optical element 30 according to this example is used as the diffraction optical element 30 in the measurement device of FIG. 1.

In the aforementioned configuration, consider the case where light is projected to a position of 1,000 mm. Since 0th-order diffracted light is emitted as divergent light, the size of the 0th-order diffracted light is $(1{,}000/5)^2$ at the position of 1,000 mm relatively to the size of the light beam in the element located at a distance of 5 mm from the light source. Accordingly, on the assumption that the 0th-order diffracted light is generated at the ratio of 0.5% to incident light, the light quantity of the 0th-order diffracted light per unit area on the projection surface is $0.005 \times (5/1{,}000) = 1.25 \times 10^{-7}$ times as large as the light quantity of the incident light on the element. On the other hand, split diffracted lights, that is, ±1st-order or higher diffracted lights are emitted as parallel lights. Therefore, the size of each of the diffracted lights on the projection surface is substantially as large as the size of the light beam on the element. On the assumption that the total sum of the light quantities of the generated ±1st-order or higher diffracted lights is 70% of that of the incident light, the average value of each of spots of the generated ±1st-order or higher diffracted lights is $0.7/200{,}000 = 3.5 \times 10^{-6}$, which is a value much larger than the 0th-order diffracted light. Thus, enough S/N can be obtained.

Figure 12A:
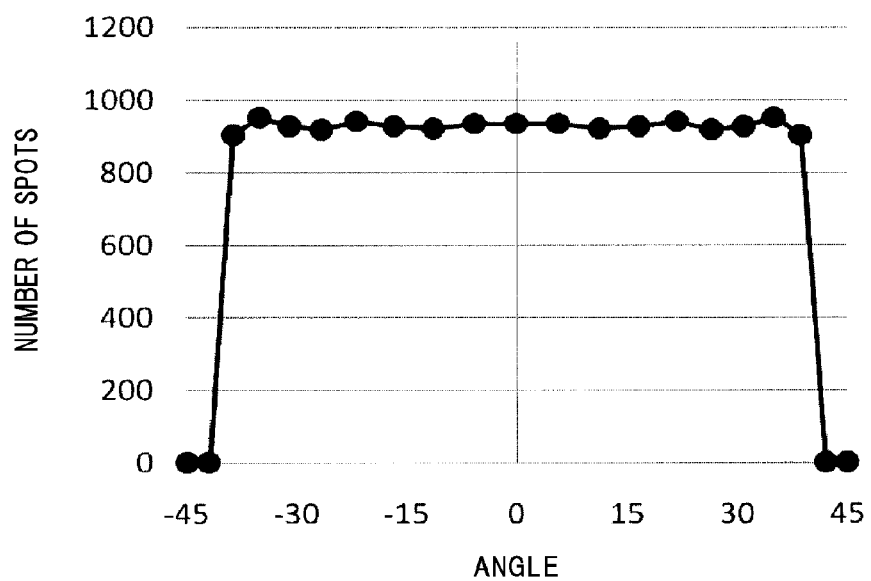
FIG. 12A is an explanatory view showing a distribution of the number of light spots on the projection surface, the light spots being formed by diffracted lights 12 emitted from the diffraction optical element 30 in the first example.
Figure 12B:
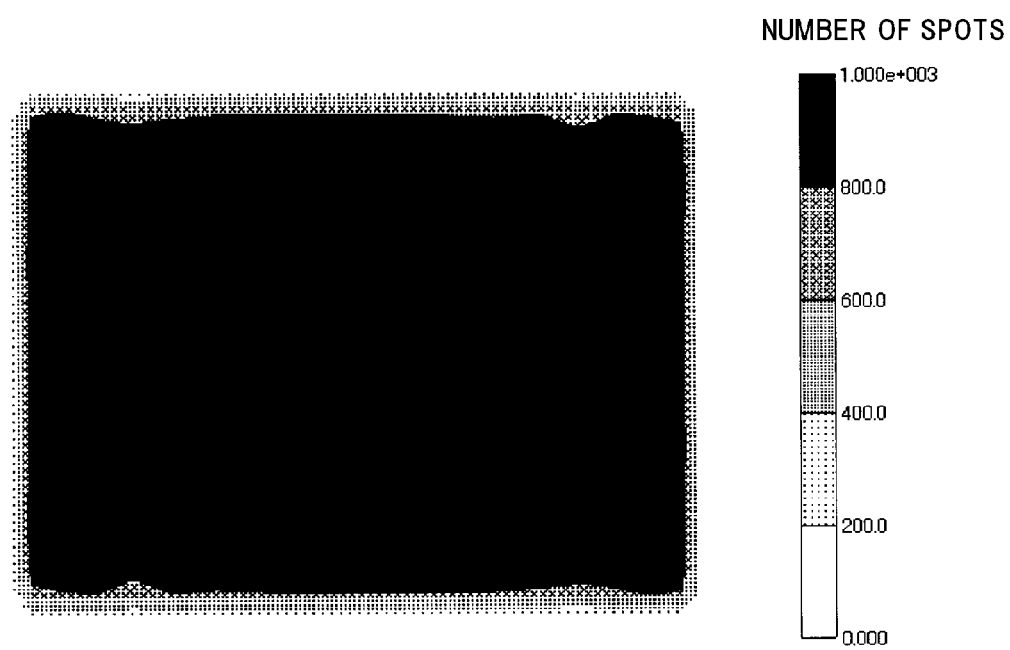
FIG. 12B is an explanatory view showing a distribution of the number of light spots on the projection surface, the light spots being formed by diffracted lights 12 emitted from the diffraction optical element 30 in the first example.

In addition, FIG. 12A shows the number of light spots in the horizontal direction or more specifically the number of ±1st-order or higher diffracted lights plotted with respect to each angle when the projection range of ±45° in the projection surface is divided into 21×21 regions. FIG. 12B shows a distribution of the number in each region. In the diffraction optical element according to this example, the number of diffracted lights of orders with large diffraction angles is increased so that the average number of light spots can be made uniform on the projection surface. As a result, the number of spots can be obtained uniformly on the projection surface as shown in FIG. 12B.

Example 2

A second example is an example of the diffraction optical element 30 in which a plurality of diffracted lights as divergent lights having different divergence angles from that of incident light are emitted in response to the incident light as divergent light so that the whole surface of a projection surface can be irradiated therewith. Incidentally, the diffraction optical element 30 itself is the same as that in the first example.

The diffraction optical element 30 shown in the first example is irradiated with laser light of 850 nm from a light emitting point located at a distance of 4.5 mm. FWHM of a spread angle of a light beam from a laser light source is the same as that in the first example, that is, 10° horizontally and 30° vertically. Due to the divergence angle converting function expressing the phase distribution $\varphi_1$, a light beam radiated to a position located at a distance of 3 mm from the optical axis is emitted as divergent light with a divergence angle of 2.3°. Due to the light beam splitting function expressing the phase distribution $\varphi_2$, main rays are emitted as diffracted lights radiated to positions of light spots 14 forming a light pattern shown in FIG. 10, respectively. As a result, each of the light spots 14 irradiated with the diffracted lights has spread so that the whole surface of the projection surface can be irradiated with the lights.

On the aforementioned incident conditions, the diffraction optical element 30 according to this example is used as the diffraction optical element 30 in the measurement device of FIG. 1.

In the aforementioned configuration, consider the case where light is projected to a position of 1,000 mm. Since 0th-order diffracted light is emitted as divergent light, the size of the 0th-order diffracted light is $(1{,}000/4.5)^2$ at the position of 1,000 mm relatively to the size of the light beam in the element located at a distance of 4.5 mm from the light source. Accordingly, on the assumption that the 0th-order diffracted light is generated at the ratio of 0.5% to incident light, the light quantity of the 0th-order diffracted light per unit area on the projection surface is $0.005 \times (4.5/1{,}000)^2 = 1.01 \times 10^{-7}$ times as large as the light quantity of the incident light on the element. On the other hand, split diffracted lights, that is, ±1st-order or higher diffracted lights are projected to a range of horizontally ±40.2° and vertically ±32.4°. The area in the projection surface is $2.1 \times 10^6$ mm², and the area of the light beam within the FWHM of the incident light on the diffraction optical element is 1.84 mm². Here, on the assumption that the total sum of the light quantities of the generated ±1st-order or higher diffracted lights is 70% of that of the incident light, the average value of each of the diffracted lights on the projection surface is $0.7 \times 1.84/2.1 \times 10^6 = 6.1 \times 10^{-7}$, which is a value much larger than the 0th-order diffracted light. Thus, the occurrence of the 0th-order diffracted light causes a small influence on the light quantity distribution of the ±1st-order or higher diffracted lights.

Figure 13A:
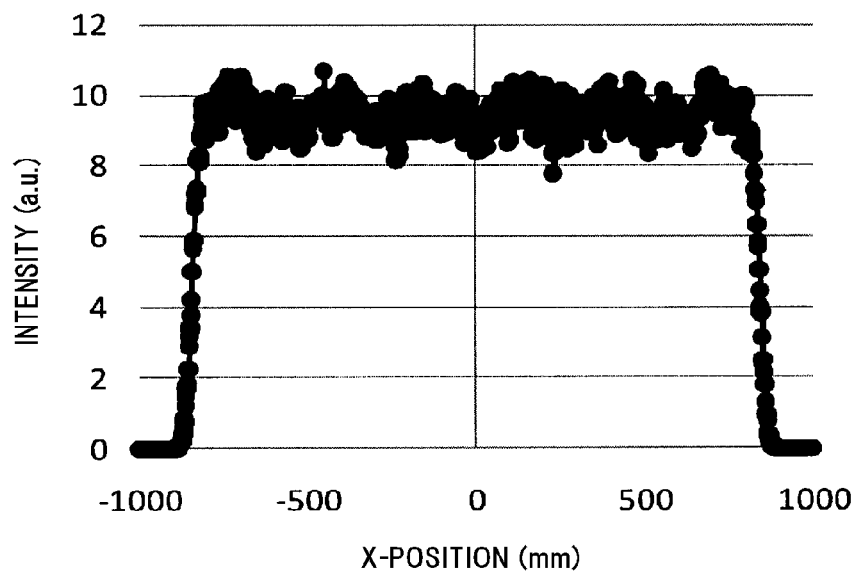
FIG. 13A is an explanatory view showing a distribution of light intensity on the projection surface, the light intensity being formed by the diffracted lights 12 emitted from the diffraction optical element 30 in the first example.
Figure 13B:
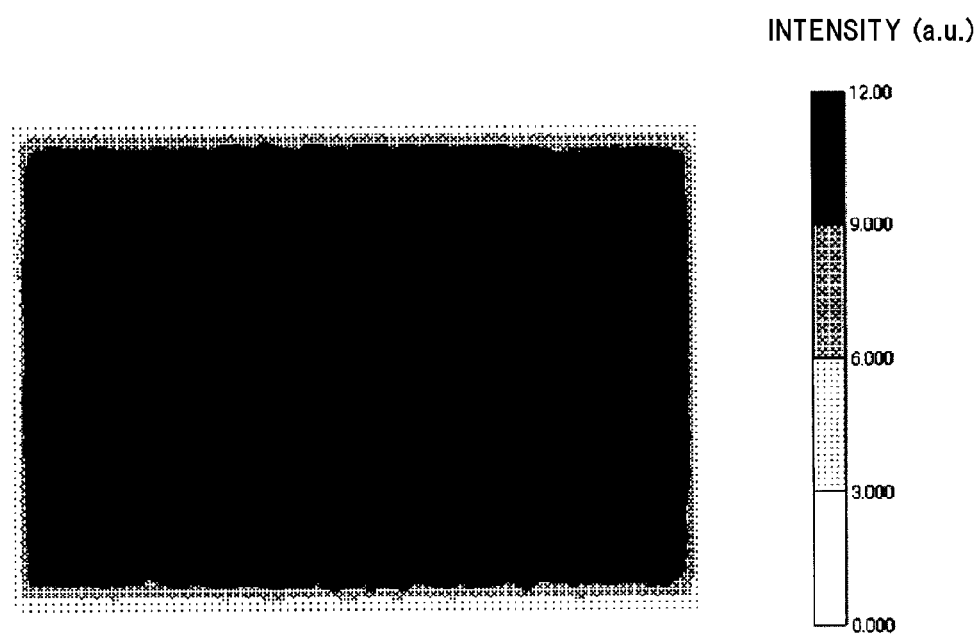
FIG. 13B is an explanatory view showing the distribution of light intensity on the projection surface, the light intensity being formed by the diffracted lights 12 emitted from the diffraction optical element 30 in the first example.

In addition, FIG. 13A shows the intensity of ±1st-order or higher diffracted lights in the horizontal direction, calculated using ray tracing with respect to each angle when the projection range of ±45° in the projection surface is divided into 1,001×1,001 regions. FIG. 13B shows a distribution of the intensity in each region. In the diffraction optical element according to this example, the number of diffracted lights of orders with large diffraction angles is increased so that the average number of light spots can be made uniform on the projection surface. As a result, a uniform intensity distribution can be obtained on the projection surface as shown in FIG. 13B.

Example 3

A third example is an example of the measurement device 10 placed to be inclined with respect to a projection surface to be illuminated uniformly, and the diffraction optical element 30 for use in the measurement device 10.

The measurement device 10 in this example will be described with reference to FIG. 3. The measurement device 10 in this example is disposed to irradiate a measuring object from above at an angle of 45°. That is, $\alpha = 45°$.

Figure 14:
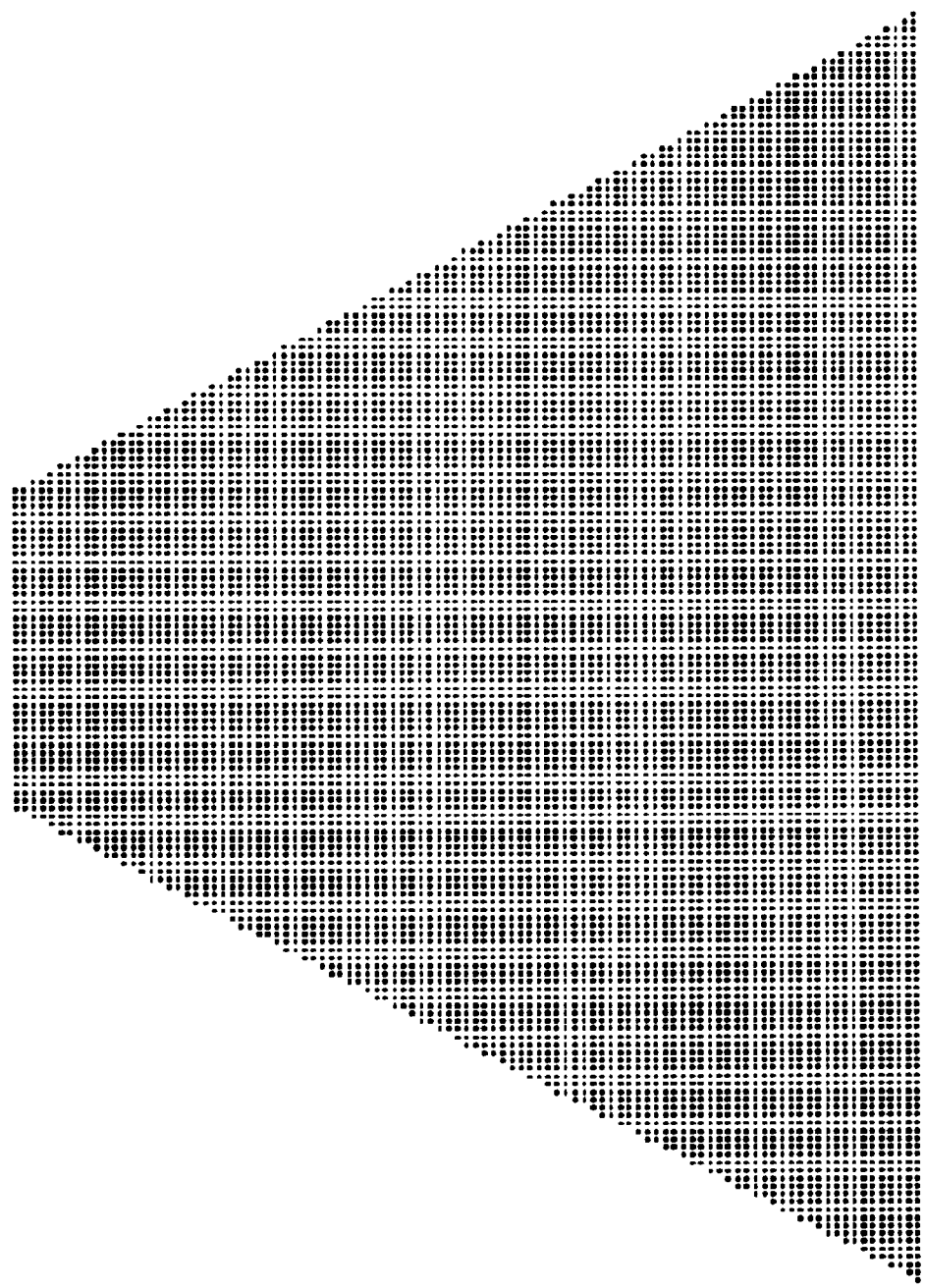
FIG. 14 is an explanatory view showing a distribution of light spots observed from the normal line direction of a surface S2, the light spots being formed by diffracted lights emitted from a diffraction optical element 30 in a third example.
Figure 15:
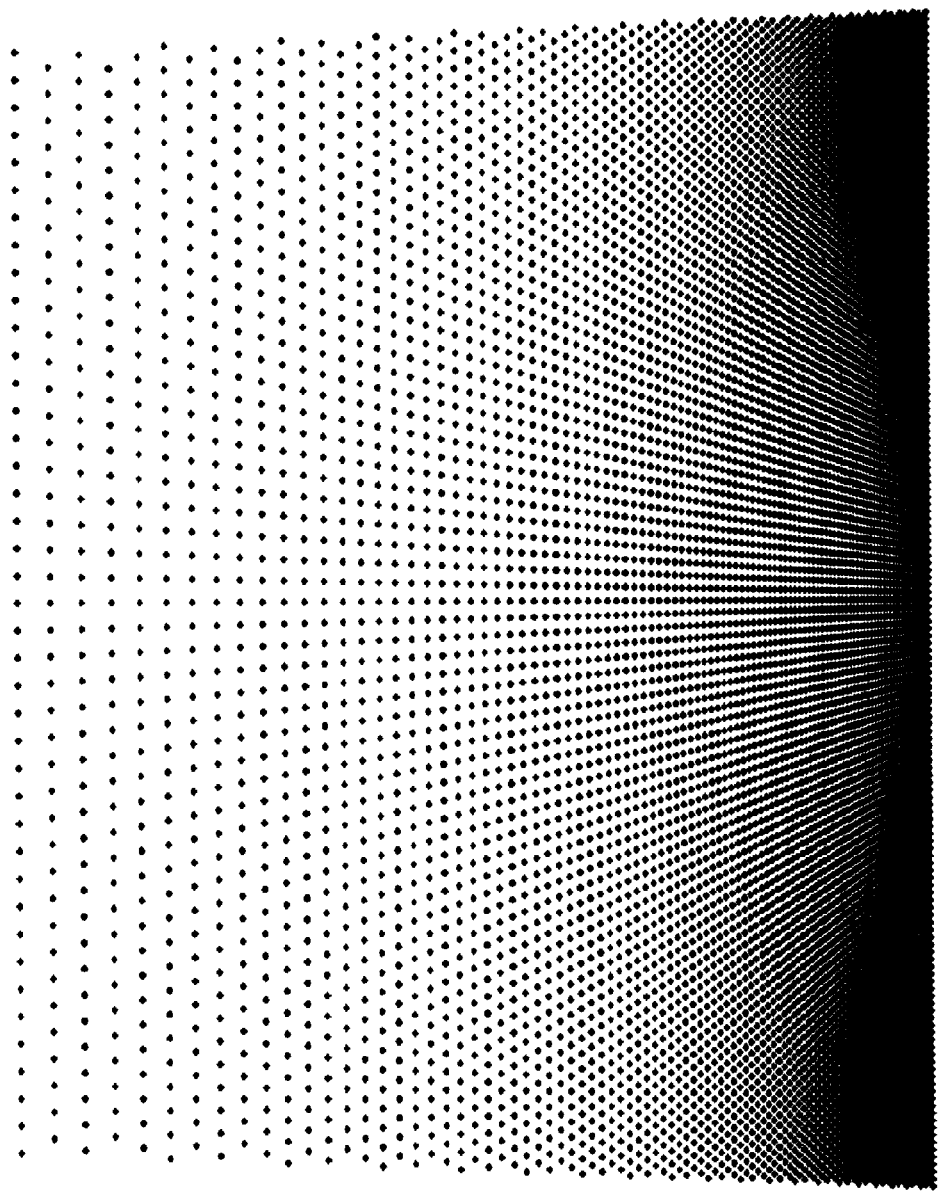
FIG. 15 is an explanatory view showing a distribution of light spots on a surface S1, the light spots being formed by diffracted lights 12 emitted from the diffraction optical element 30 in the third example.

In addition, the diffraction optical element 30 belonging to the measurement device 10 in this example projects light spots 14 within a range of horizontally ±37.8° and vertically ±30.4° from the optical axis. In this example, $\beta = 37.8°$ in the horizontal direction and $\beta = 30.4°$ in the vertical direction. On those conditions, the diffraction optical element 30 is designed to emit a light pattern having a uniform light quantity distribution of light in the surface S2 of FIG. 3. FIG. 14 shows a distribution of light spots 14 on the surface S2 observed from the normal line direction of the surface S2. In FIG. 14, the range where the light spots 14 are present has a trapezoidal shape. This is because, when a detection range of the detection element 50 is projected to the surface S2, the detection range on the surface S2 becomes trapezoidal due to the inclination of the surface S2. In addition, FIG. 15 shows a distribution of light spots when such light spots are projected to the surface S1. The number of the light spots is 10,121.

In the diffraction optical element 30 in this example, a phase distribution in which light from a light emitting point located at a distance of 5 mm in the same manner as in the first example and the second example can be made into parallel light is used as the phase distribution $\varphi_1$.

On the other hand, as the phase distribution $\varphi_2$, a phase distribution of a splitting diffraction optical element for emitting a light pattern so that a light pattern as shown in FIG. 15 can be formed in the surface S1 of FIG. 3 when parallel light is incident is calculated by an iterative Fourier transform method. Incidentally, the obtained phase distribution is disposed at a pitch of 1 mm and within a plane measuring 3 mm by 6 mm. Thus, the phase distribution is used as the phase distribution $\varphi_2$.

Next, the phase expressed by the phase distribution $\varphi_1$ and the phase expressed by the phase distribution $\varphi_2$ is superimposed on each other to obtain a phase distribution $\varphi$ for the diffraction portion 31. The obtained phase distribution $\varphi$ is converted into a concavity and convexity shape to obtain the concavity and convexity shape of the diffraction portion 31. In this example, obtained is a concavity and convexity shape in which each stage is 230 nm high and the maximum number of stages is eight. Incidentally, the outer shape of the element measures 4 mm by 7 mm, and the periphery around a part measuring 3 mm by 6 mm is formed as diffraction grating at a pitch of 1 μm so that a projection range can be prevented from being irradiated with stray light.

A quartz glass 0.525 mm thick is washed, and photolithography and etching are then repeated. Thus, the quartz glass is processed so that the surface can be formed into the aforementioned concavity and convexity shape. In this manner, a concavity and convexity pattern made of concavities and convexities in which each stage is 230 nm high and the maximum number of stages is eight is formed in the surface of the quartz glass.

The diffraction optical element 30 obtained thus is irradiated with laser light of 850 nm from a light emitting point located at a distance of 4 mm from the element. FWHM of a spread angle of a light beam from a laser light source is 30° horizontally and 10° vertically. Due to the divergence angle converting function expressing the phase distribution $\varphi_1$, a light beam radiated to a position located at a distance of 3 mm from the optical axis is emitted as divergent light with a divergence angle of 4.9°. Due to the light beam splitting function expressing the phase distribution $\varphi_2$, main rays are emitted as diffracted lights to be radiated to positions of light spots 14 forming a light pattern shown in FIG. 15 in the surface S1, respectively. As a result, each of the light spots 14 irradiated with the diffracted lights has spread so that the whole surface of the projection surface can be irradiated with the lights.

In the aforementioned configuration, consider the case where light is projected to a position of 1,000 mm. Since 0th-order diffracted light is emitted as divergent light, the size of the 0th-order diffracted light is $(1,000/4)^2$ at the position of 1,000 mm relatively to the size of the light beam in the element located at a distance of 4 mm from the light source. Accordingly, on the assumption that the 0th-order diffracted light is generated at the ratio of 0.5% to incident light, the light quantity of the 0th-order diffracted light per unit area on the projection surface is $0.005 \times (4/1,000) = 8 \times 10^{-8}$ times as large as the light quantity of the incident light on the element. On the other hand, split diffracted lights, that is, ±1st-order or higher diffracted lights are projected to a range of horizontally ±40.2° and vertically ±32.4°. The area in the projection surface is $1.8 \times 10^6$ mm$^2$, and the area of the light beam within the FWHM of the incident light on the diffraction optical element is 1.84 mm$^2$. On the assumption that the total sum of the light quantities of the generated ±1st-order or higher diffracted lights is 70% of that of the incident light, the average value of each of the diffracted lights on the projection surface is $0.7 \times 1.84/1.8 \times 10^6 = 7.2 \times 10^{-7}$, which is a value much larger than the 0th-order diffracted light. Thus, the occurrence of the 0th-order diffracted light causes a small influence on the light quantity distribution of the ±1st-order or higher diffracted lights.

Figure 16A:
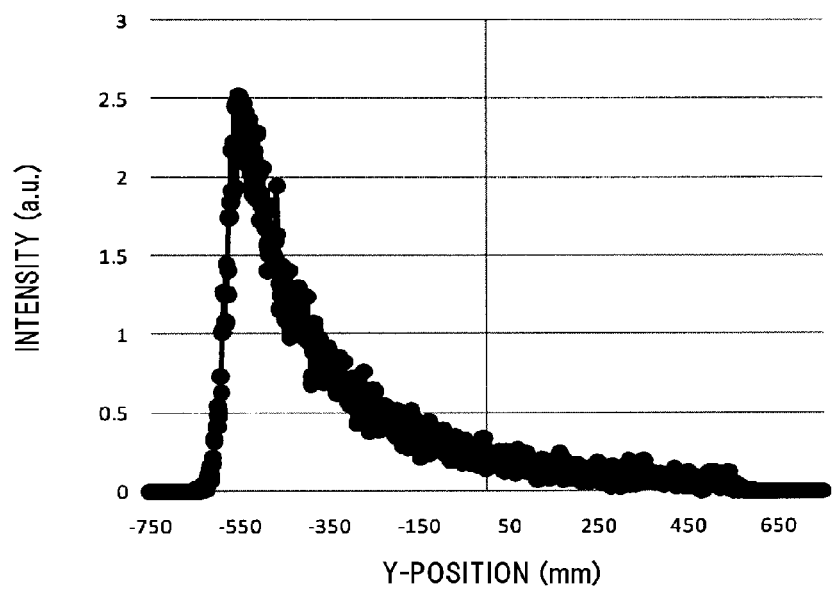
FIG. 16A is an explanatory view showing a distribution of light intensity on the surface S1, the light intensity being formed by the diffracted lights 12 emitted from the diffraction optical element 30 in the third example.
Figure 16B:
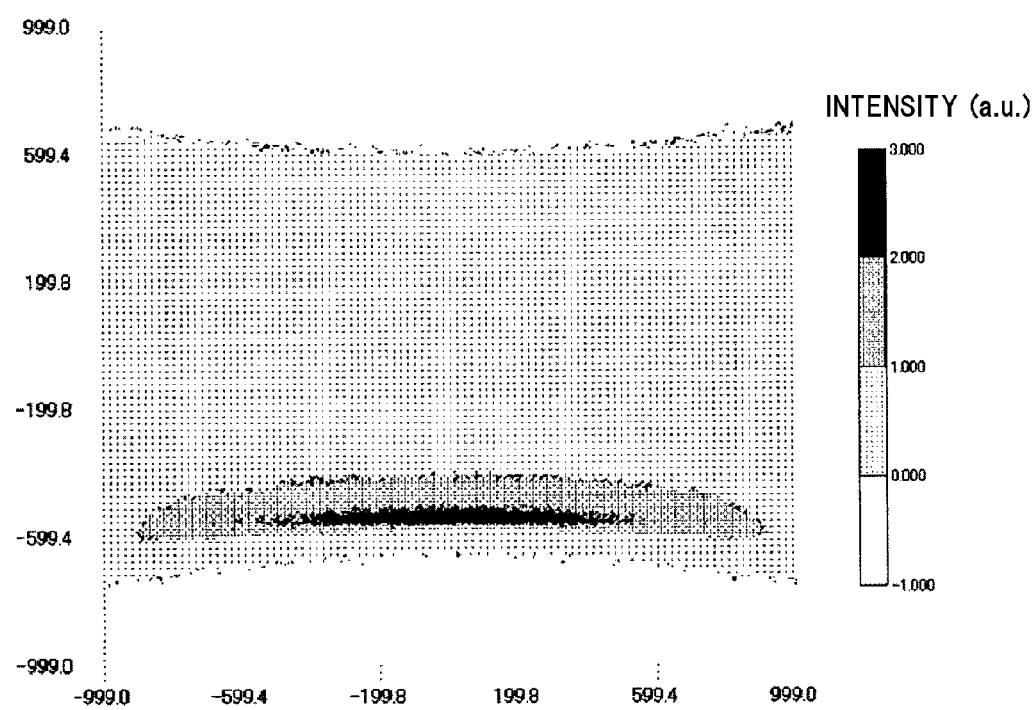
FIG. 16B is an explanatory view showing the distribution of light intensity on the surface S1, the light intensity being formed by the diffracted lights 12 emitted from the diffraction optical element 30 in the third example.
Figure 17A:
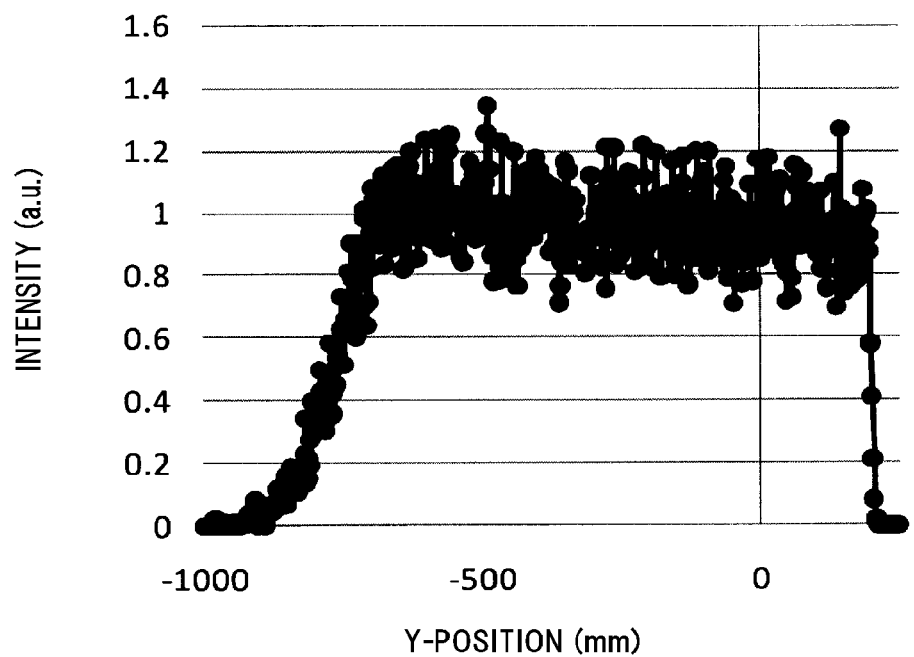
FIG. 17A is an explanatory view showing a distribution of light intensity on the surface S2, the light intensity being formed by the diffracted lights 12 emitted from the diffraction optical element 30 in the third example.
Figure 17B:
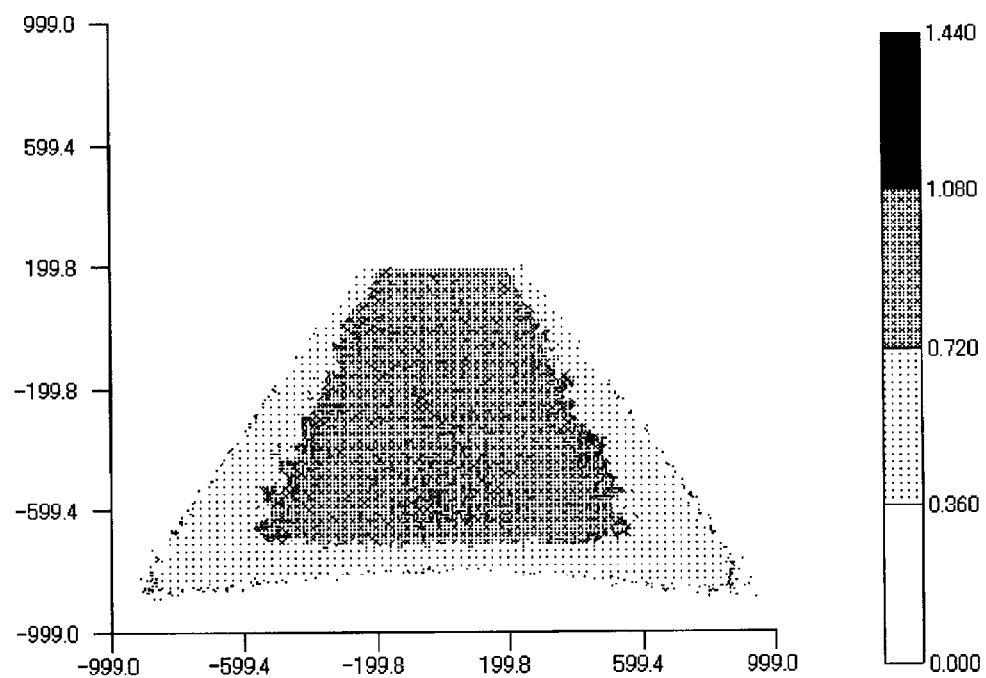
FIG. 17B is an explanatory view showing the distribution of light intensity on the surface S2, the light intensity being formed by the diffracted lights 12 emitted from the diffraction optical element 30 in the third example.

In addition, FIG. 16A shows the intensity of ±1st-order or higher diffracted lights in the vertical direction, calculated using ray tracing when the projection range of 2,000 mm by 2,000 mm in the surface S1 is divided into 1001×1001 regions. FIG. 16B shows a distribution of the intensity in each region. The abscissa of FIG. 16B converted into an angle is proportional to $1/\{\cos(\varphi-\alpha) \times (1-\tan\alpha \tan\beta)/(1+\tan\alpha \tan\xi)\}^2$. In addition, FIG. 17A shows the calculated intensity of ±1st-order or higher diffracted lights in the vertical direction when the projection range of 2,000 mm by 2,000 mm in the surface S2 is divided into 1001×1001 regions. FIG. 17B shows a distribution of the intensity in each region. In the diffraction optical element according to this example, the number of diffracted lights of orders with large diffraction angles is increased so that the average number of light spots can be made uniform on the surface S2. As a result, a uniform intensity distribution can be obtained on the surface S2 as shown in FIG. 17B.

Although the present application has been described in detail and with reference to its specific embodiment, it is obvious for those skilled in the art that various changes or modifications can be applied to the invention without departing from the spirit and scope of the invention.

The present application is based on a Japanese patent application (Japanese Patent Application No. 2013-181310) filed on Sep. 2, 2013, the contents of which are incorporated herein by reference.

INDUSTRIAL APPLICABILITY

The present invention can be suitably applied to applications in which a predetermined light pattern should be emitted to a predetermined projection range or applications in which overall irradiation should be performed. Particularly the invention can be suitably applied to a case where a predetermined pattern is radiated without lowering the use efficiency of light or overall irradiation is performed when the divergence angle of incident light is large.

DESCRIPTION OF REFERENCE NUMERALS 10 measurement device
11, 11a, 11b, 11c incident light
12, 12a, 12b, 12c, 12d diffracted light
13 reflected light
14 light spot
20 light source
30 diffraction optical element
31 diffraction portion
32 peripheral portion
40a, 40b measuring object
50 detection element
60 projection device

The invention claimed is:
1. A diffraction optical element, comprising:
a substrate having a disk-shape and having a concavity and convexity pattern formed on a main surface of the substrate such that the concavity and convexity pattern gives an incident light beam a phase distribution,
wherein the substrate, by diffraction, changes a divergence angle of an incident light beam and splits the incident light beam into a plurality of light beams such that the incident light beam is split into a plurality of diffracted light beams having divergence angles different from a divergence angle of the incident light beam and that the plurality of diffracted light beams generates light spots onto a projection surface, the concavity and convexity pattern has heights and depths determined by the phase distribution obtained by superimposing a first phase distribution φ1 which is rotationally symmetric and changes a divergence angle of the incident light beam and a second phase distribution φ2 which splits the incident light beam such that the remainder of dividing the phase distribution by 2π is set at a value obtained by multiplying an optical path difference generated due to concavities and convexities by 2π/λ, where λ is a wavelength of the incident light, the first phase distribution φ1 is represented by Expression (2)

$$\phi_1 = \sum_i a_i r^{2i} + A \qquad \text{Expression (2)}$$

where $a_i$ is a coefficient of the phase function, r is a distance from a center of the disk-shape, and A is a constant, and the second phase distribution φ2 is obtained by iterative Fourier transform of a blackening degree distribution or light intensity distribution of the light spots to be projected onto the projection surface, using a density or light intensity of each diffracted light beam as a parameter.

2. The diffraction optical element according to claim 1, wherein the first phase distribution is expressed by two or more-steps of the concavity and convexity pattern, the number of the steps is smaller at a periphery of the disk-shape than around a center of the disk-shape, and a height of each step in the concavity and convexity pattern is greater at the periphery of the disk-shape than around the center of the disk-shape.

3. The diffraction optical element according to claim 1, wherein the diffraction optical element diffracts divergent light to parallel light.

4. The diffraction optical element according to claim 2, wherein the diffraction optical element diffracts divergent light to parallel light.

5. The diffraction optical element according to claim 1, wherein the heights and depths of the concavity and convexity pattern are determined such that an average value of a light quantity in each of a plurality of regions on the projection surface which is set perpendicular to an optical axis of 0th-order diffracted light increases or decreases along at least one direction.

6. The diffraction optical element according to claim 2, wherein the heights and depths of the concavity and convexity pattern are determined such that an average value of a light quantity in each of a plurality of regions on the projection surface which is set perpendicular to an optical axis of 0th-order diffracted light increases or decreases along at least one direction.

7. The diffraction optical element according to claim 3, wherein the heights and depths of the concavity and convexity pattern are determined such that an average value of a light quantity in each of a plurality of regions on the projection surface which is set perpendicular to an optical axis of 0th-order diffracted light increases or decreases along at least one direction.

8. The diffraction optical element according to claim 4, wherein the heights and depths of the concavity and convexity pattern are determined such that an average value of a light quantity in each of a plurality of regions on the projection surface which is set perpendicular to an optical axis of 0th-order diffracted light increases or decreases along at least one direction.

9. The diffraction optical element according to claim 5, wherein the heights and depths of the concavity and convexity pattern are determined such that a density of the diffracted lights in each of the plurality of regions on the projection surface or an average light intensity of the diffracted lights in each of the plurality of regions on the projection surface increases or decreases along at least one direction.

10. The diffraction optical element according to claim 6, wherein the heights and depths of the concavity and convexity pattern are determined such that a density of the diffracted lights in each of the plurality of regions on the projection surface or an average light intensity of the diffracted lights in each of the plurality of regions on the projection surface increases or decreases along at least one direction.

11. The diffraction optical element according to claim 7, wherein the heights and depths of the concavity and convexity pattern are determined such that a density of the diffracted lights in each of the plurality of regions on the projection surface or an average light intensity of the diffracted lights in each of the plurality of regions on the projection surface increases or decreases along at least one direction.

12. The diffraction optical element according to claim 8, wherein the heights and depths of the concavity and convexity pattern are determined such that a density of the diffracted lights in each of the plurality of regions on the projection surface or an average light intensity of the diffracted lights in each of the plurality of regions on the projection surface increases or decreases along at least one direction.

13. A projection device, comprising:
    the diffraction optical element of claim 1; and
    a light source configured to emit divergent light to the diffraction optical element, wherein diffracted lights diffracted by the diffraction optical element generate light spots onto a projection surface.

14. A measurement device, comprising:
    the projection device of claim 13, and configured to irradiate a measuring object with the plurality of light spots; and
    a detection portion configured to detect scattered light generated by irradiation of the measuring object with light emitted from the projection device.

15. The diffraction optical element according to claim 1, wherein the number of the plurality of the diffracted light beams is more than 100.

16. The diffraction optical element according to claim 1, wherein the heights and depths of the concavity and convexity pattern are determined such that 0th-order diffracted light is emitted as divergent light, and diffracted lights other than the 0th-order diffracted lights are emitted as parallel lights or light beams with a divergence angle smaller than a divergence angle of the 0th-order diffracted light.

17. The diffraction optical element according to claim 1, wherein the heights and depths of the concavity and convexity pattern are determined such that a density of each of the diffracted light beams increase as it goes apart from an optical axis of 0th-order diffracted light.

18. The projection device according to claim 13, wherein the divergence angle of the incident light beam is 5° or more.

19. The projection device according to claim 13, wherein the divergence angle of the incident light beam is 5° or more, a divergence angle of 0th-order diffracted light is the same as the divergence angle of the incident light beam, and a divergence angle of other diffracted lights other than the 0th-order diffracted light is 2.5° or less.

* * * * *